(12) United States Patent
Feustel et al.

(10) Patent No.: US 11,976,248 B2
(45) Date of Patent: May 7, 2024

(54) DISPERSIONS OF POLYMERIC OIL ADDITIVES

(71) Applicant: Clariant International Ltd., Muttenz (CH)

(72) Inventors: Michael Feustel, Köngernheim (DE); Matthias Krull, Harxheim (DE); Victor Goncharov, Moscow (RU)

(73) Assignee: Dorf Ketal Energy Services LLC, The Woodlands, TX (US)

( * ) Notice: Subject to any disclaimer, the term of this patent is extended or adjusted under 35 U.S.C. 154(b) by 0 days.

(21) Appl. No.: 16/646,091

(22) PCT Filed: Aug. 13, 2018

(86) PCT No.: PCT/EP2018/071865
§ 371 (c)(1),
(2) Date: Mar. 10, 2020

(87) PCT Pub. No.: WO2019/057396
PCT Pub. Date: Mar. 28, 2019

(65) Prior Publication Data
US 2020/0283692 A1      Sep. 10, 2020

(30) Foreign Application Priority Data
Sep. 20, 2017   (EP) ..................... 17192120

(51) Int. Cl.
| | | |
|---|---|---|
| *C10L 1/14* | (2006.01) | |
| *C09K 23/22* | (2022.01) | |
| *C09K 23/44* | (2022.01) | |
| *C10L 1/12* | (2006.01) | |
| *C10L 1/16* | (2006.01) | |
| *C10L 1/182* | (2006.01) | |
| *C10L 1/188* | (2006.01) | |
| *C10L 1/196* | (2006.01) | |
| *C10L 1/197* | (2006.01) | |
| *C10L 1/198* | (2006.01) | |
| *C10L 1/224* | (2006.01) | |

(52) U.S. Cl.
CPC .............. *C10L 1/146* (2013.01); *C09K 23/22* (2022.01); *C09K 23/44* (2022.01); *C10L 1/125* (2013.01); *C10L 1/1641* (2013.01); *C10L 1/1822* (2013.01); *C10L 1/1881* (2013.01); *C10L 1/1963* (2013.01); *C10L 1/1973* (2013.01); *C10L 1/1981* (2013.01); *C10L 1/1985* (2013.01); *C10L 1/224* (2013.01); *C10L 2200/0453* (2013.01); *C10L 2250/082* (2013.01)

(58) Field of Classification Search
CPC ........ C10L 1/146; C10L 1/125; C10L 1/1641; C10L 1/1822; C10L 1/1881; C10L 1/1963; C10L 1/1973; C10L 1/1985; C10L 1/224; C10L 2200/0453; C10L 2250/082

See application file for complete search history.

(56) References Cited

U.S. PATENT DOCUMENTS

| | | | | |
|---|---|---|---|---|
| 6,063,146 A | * | 5/2000 | Miller ...................... | C09K 8/52 44/437 |
| 8,763,724 B2 | * | 7/2014 | Muller ................... | C09K 8/528 175/64 |
| 2010/0025290 A1 | * | 2/2010 | Feustel ..................... | C10L 1/10 524/186 |
| 2010/0130385 A1 | * | 5/2010 | Guzmann ................. | C10L 1/10 507/90 |
| 2013/0183628 A1 | * | 7/2013 | Papachristos ........... | C10L 1/305 431/4 |
| 2017/0009172 A1 | * | 1/2017 | Bender ................. | C07C 211/63 |

FOREIGN PATENT DOCUMENTS

| | | |
|---|---|---|
| DE | 102005039143 | 2/2007 |
| EA | 200900865 A1 | 12/2009 |
| EA | 201791908 A1 | 12/2017 |
| EP | 3684892 B1 | 4/2021 |
| RU | 2082490 C1 | 6/1997 |
| WO | 2008083724 | 7/2008 |
| WO | 2016137922 | 9/2016 |

* cited by examiner

*Primary Examiner* — Latosha Hines
(74) *Attorney, Agent, or Firm* — Conley Rose, P.C.; Rodney B. Carroll

(57) ABSTRACT

The invention provides dispersions comprising
I) at least one oil-soluble polymer effective as a cold flow improver for mineral oils,
II) at least one organic, water-immiscible solvent,
III) a dispersant comprising, based on the total amount of dispersant,
  a) 10-90% by weight of a salt of an ethercarboxylic acid and
  b) 90-10% by weight of a nonionic surfactant,
IV) water and
V) at least one organic, water-miscible solvent.

33 Claims, No Drawings

DISPERSIONS OF POLYMERIC OIL ADDITIVES

Crude oils and products produced therefrom are complex mixtures of different kinds of substances, some of which can present problems during production, transport, storage and/or further processing. For instance, crude oil and also products derived therefrom, for example middle distillates, heavy heating oil, marine diesel, bunker oil or residue oils, contain long-chain hydrocarbons, the solubility of which in the oil is exceeded at low temperatures. They crystallize to form a three-dimensional network of flakes and/or fine needles. At low temperatures, the effects of this include impairment of the flowability of the oils, for example on transport in pipelines, and trapping of considerable amounts of oil in storage tanks between the paraffins that crystallize out at the tank walls in particular.

Therefore, additives for modifying the paraffin crystals are often added to paraffin-containing mineral oils for transport and storage. These are predominantly synthetic polymeric compounds. The so-called paraffin inhibitors or pour point depressants improve the cold flowability of the oils, for example by nucleation of paraffin crystals and/or cocrystallization with the paraffins that precipitate out on cooling, which prevents the formation of a three-dimensional network of paraffin crystals. They often also bring about dispersion of the precipitated crystals. They thus lead to lowering of the pour point of the paraffinic mineral oils and hence to improved flowability at low temperatures.

The commonly used polymeric paraffin inhibitors are oil-soluble compounds and are insoluble in water. They are typically prepared by bulk polymerization or solution polymerization in organic, predominantly aromatic solvents. Owing to the long-chain paraffinic structural elements that are required for good efficacy and high molecular weights of these polymers, their concentrated solutions in organic solvents have intrinsic pour points that are often above the ambient temperatures on use thereof. For use, these additives consequently have to be highly diluted or stored and handled at elevated temperatures, both of which lead to unwanted additional cost and inconvenience.

Processes for producing paraffin inhibitors by emulsion polymerization have been proposed, which are said to lead to additives that are easier to handle.

For instance, WO-03/014170 discloses pour point depressants produced by emulsion copolymerization of alkyl (meth)acrylates with water-soluble and/or polar comonomers. These are prepared, for example, in dipropylene glycol monomethyl ether or in water/Dowanol® with alkylbenzylammonium chloride and a fatty alcohol alkoxylate as emulsifiers.

EP-A-0359061 discloses emulsion polymers of long-chain alkyl (meth)acrylates with acidic comonomers.

However, the efficacy of these emulsion copolymers is generally unsatisfactory, probably because of the alteration in molecular weight distribution by the polymerization process and the highly polar comonomer units incorporated to improve their emulsification properties.

A further approach to a solution for production of paraffin inhibitors that are easier to handle is that of emulsifying polymers prepared in organic solvents and/or dissolved in such solvents in a nonsolvent for the polymeric active ingredient.

For instance, EP-A-0448166 discloses dispersions of polymers of ethylenically unsaturated compounds containing aliphatic hydrocarbyl radicals having at least 10 carbon atoms in glycols and optionally water. Dispersants used are ether sulfates and lignosulfonates. The emulsions are stable at 50° C. for at least one day and liquid at temperatures down to 0° C. and in some cases down to −20° C.

U.S. Pat. No. 5,851,429 discloses dispersions in which a pour point depressant solid at room temperature is dispersed in a nonsolvent. Suitable "non"-solvents mentioned include alcohols, esters, ethers, lactones, ethoxyethyl acetate, ketones, glycols and alkyl glycols, and mixtures thereof with water. As dispersants, the dispersions comprise anionic surfactants such as neutralized fatty acids or sulfonic acids, cationic, nonionic or zwitterionic detergents.

WO-98/33846 discloses dispersions of paraffin inhibitors based on ester polymers and the dissolution thereof in aliphatic or aromatic hydrocarbons in a nonsolvent, for example glycol and/or water. Dispersants used are anionic surfactants such as carboxylic and sulfonic salts and especially fatty acid salts, nonionic dispersants such as nonylphenol alkoxylates or cationic dispersants such as CTAB.

WO-05/023907 discloses emulsions of at least two different paraffin inhibitors selected from ethylene-vinyl acetate copolymers, poly(alkyl acrylates) and alkyl acrylate-grafted ethylene-vinyl acetate copolymers. The emulsions comprise water, an organic solvent, otherwise unspecified anionic, cationic and/or nonionic surfactants, and a water-soluble solvent.

WO-2008/125588 discloses a process for producing a paraffin inhibitor formulation comprising a paraffin inhibitor component in the form of a wax, an emulsifier component and optionally water, in which an o/w emulsion is produced above the melting point of the paraffin inhibitor component and then cooled. The surfactants and surfactant mixtures used may be anionic, nonionic, amphoteric or cationic. A surfactant system demonstrated by way of example is a $C_{16}$-$C_{18}$ fatty alcohol ethoxylate mixture having an HLB of about 15.

DE-102005039143 teaches a composition for hydrophilization of organic substances which comprises at least one nonionic surfactant and at least one membrane-forming substance, especially an anionic surfactant, an organic substance comprising such a composition, a process for hydrophilizing organic substances, and the use of such hydrophilizing agents. Preferred uses here are the hydrophilization of organic-based cutting coolants, organic-based drawing and die-cutting oils, diesel fuels, gasoline fuels, lubricant oils, heavy oils, refined mineral oil fractions, unrefined mineral oil and fractions thereof.

RU-2082490 teaches a dispersant comprising ethoxylated alcohols or alkylphenols, and additionally ether carboxylates. The ether carboxylates conform to the formula R—$(OC_2H_4)_n$—$CH_2$—COONa in which R is n-$C_{10}$ to $C_{18}$-alkyl or alkylphenyl, and n is 7-12. The mixing ratio is 0.63:0.37 to 0.17:0.83.

WO-2008/083724 discloses dispersions comprising I) at least one oil-soluble polymer effective as a cold flow improver for mineral oils, II) at least one organic, water-immiscible solvent, III) water, IV) at least one alkanolamine salt of a polycyclic carboxylic acid and V) optionally at least one water-miscible organic solvent. They are used to improve the cold flow properties of paraffinic mineral oils and products derived therefrom. The dispersions have low viscosities and, in specific embodiments, intrinsic pour points of in some cases below −24° C.

WO-2016/137922 discloses aqueous dispersions comprising an ethylene-vinyl acetate copolymer (EVA), a dispersant, a polyethoxylated nonionic surfactant, a hydrocarbon as solvent, water and optionally an aqueous freezing point depressant, and the use thereof as a pour point depressant. The function of the polyethoxylated nonionic surfactant here is to maintain the stability of the dispersion in the presence of hydrocarbons and to prevent gelation and/or precipitation of the polymeric active ingredient.

WO-2017/093962 discloses aqueous emulsions comprising solutions of ethylene-vinyl acetate copolymers and/or polyalkyl(meth)acrylates in high-boiling organic solvents, wherein the difference between the Hildebrand solubility parameters of polymer and organic solvent is less than 2. Emulsifiers used are alkali metal and alkaline earth metal salts of fatty acids.

A particular problem with the approaches to a solution in the prior art is that ease of handling of highly concentrated additive formulations at very low temperatures is still unsatisfactory. As well as the flowability, which is determinable via the pour point according to ISO 3016, the significant rise in viscosity at low temperatures in dispersions comprising paraffin inhibitors is a particular problem. Even though the prior art dispersions are often still free-flowing, high forces are required to convey the high-viscosity products, which entails the use of special pumps. Furthermore, starting and restarting the additive dosage of the dispersions that have cooled under static conditions in a pipeline, as occur, for example, on commencement or stoppage of production in oil production, frequently require very high pressures to overcome the yield point. The yield point is the lowest shear stress above which a sample behaves like a liquid, and hence the smallest force which is required to break the structure of a sample at rest. The yield point is typically determined with a rotary viscometer according to DIN EN ISO 3219. In addition, it would be desirable to improve the miscibility of the hydrophobic active ingredients from their hydrophilic carrier medium into the mineral oil to be treated. Furthermore, long-term stability of the dispersions over several weeks to months has to be assured.

There has consequently been a search for additives that are suitable as paraffin inhibitors and especially as pour point depressants for paraffinic mineral oils, and are free-flowing and additionally readily pumpable in the form of concentrates at low temperatures below −10° C., especially below −20° C. and particularly below −30° C. In order to simplify use at low temperatures, they are to have a minimum viscosity at these temperatures. To ensure the required metering rates on commencement of oil production or on restarting of conveying after production stoppages, they are also to have a minimum yield point at such low temperatures. The additives are to retain their performance-related and physical properties, such as their phase stability in particular, over a prolonged period of weeks to months, even at elevated temperatures. Furthermore, they are to have at least the same efficacy as their active ingredients used from mineral oil-based formulations under optimal mixing-in conditions.

It has been found that, surprisingly, superior properties are possessed by aqueous dispersions of oil-soluble polymers which are effective as cold flow improvers for mineral oils and which comprise, as dispersant, a salt of an ethercarboxylic acid and a nonionic surfactant. Dispersions of this kind in a continuous phase composed of water and a water-soluble organic solvent are free-flowing at temperatures below −20° C. and often even below −30° C. Even at low temperatures, they have very low viscosity and a low yield point. Both at low temperatures and at elevated temperatures of, for example, +50° C., they are stable over several months. The use thereof at low temperature of oil and/or additive additionally leads to more effective paraffin inhibition than the formulation of the same active ingredient according to the prior art. Furthermore, the paraffin-inhibiting efficacy thereof in mineral oils is in every case comparable, often even superior, to that of the formulation of the corresponding active ingredients applied from organic solvent.

The invention thus provides dispersions comprising an organic phase dispersed in an aqueous phase, in which
   a) the dispersed organic phase comprises at least one oil-soluble polymer effective as a cold flow improver for mineral oils as component I) and at least one organic, water-immiscible solvent as component II),
   b) the continuous aqueous phase comprises water as component IV) and at least one organic, water-miscible solvent as component V),
   characterized in that the dispersion contains
   c) 0.5% to 12% by weight of a dispersant as component III), which, based on the total amount of dispersant, comprises
      i) 5-95% by weight of a salt of an ethercarboxylic acid and
      ii) 95-5% by weight of a nonionic surfactant having an HLB value measured according to Griffin of greater than 7.

The invention further provides a process for producing dispersions comprising an organic phase dispersed in an aqueous phase, in which
   a) the dispersed organic phase comprises at least one oil-soluble polymer effective as a cold flow improver for mineral oils as component I) and at least one organic, water-immiscible solvent as component II),
   b) the continuous aqueous phase comprises water as component IV) and at least one organic, water-miscible solvent as component V),
   characterized in that the dispersion contains
   c) 0.5% to 12% by weight of a dispersant as component III), which, based on the total amount of dispersant, comprises
      i) 5-95% by weight of a salt of an ethercarboxylic acid and
      ii) 95-5% by weight of a nonionic surfactant having an HLB value measured according to Griffin of greater than 7,
by converting constituents I, II, III, IV and V to a dispersion by mixing with stirring at temperatures above 50° C.

The invention further provides for the use of dispersions comprising an organic phase dispersed in an aqueous phase, in which
   a) the dispersed organic phase comprises at least one oil-soluble polymer effective as a cold flow improver for mineral oils as component I) and at least one organic, water-immiscible solvent as component II),
   b) the continuous aqueous phase comprises water as component IV) and at least one organic, water-miscible solvent as component V),
   characterized in that the dispersion contains
   c) 0.5% to 12% by weight of a dispersant as component III), which, based on the total amount of dispersant, comprises
      i) 5-95% by weight of a salt of an ethercarboxylic acid and
      ii) 95-5% by weight of a nonionic surfactant having an HLB value measured according to Griffin of greater than 7,
for improving the cold flow properties of paraffinic mineral oils and products produced therefrom.

The invention further provides a process for improving the cold flow properties of paraffinic mineral oils and products produced therefrom, by adding dispersions comprising an organic phase dispersed in an aqueous phase to paraffinic mineral oils and products produced therefrom, in which a) the dispersed organic phase comprises at least one oil-soluble polymer effective as a cold flow improver for mineral oils as component I) and at least one organic, water-immiscible solvent as component II), b) the continuous aqueous phase comprises water as component IV) and at least one organic, water-miscible solvent as component V), characterized in that the dispersion contains c) 0.5% to 12% by weight of a dispersant as component III), which, based on the total amount of dispersant, comprises i) 5-95% by weight of a salt of an ethercarboxylic acid and ii) 95-5% by weight of a nonionic surfactant having an HLB value measured according to Griffin of greater than 7.

Cold flow improvers for mineral oils are understood to mean all those polymers that improve the cold properties and especially the cold flowability of mineral oils. The cold properties of mineral oils are measured, for example, as the pour point, cloud point, WAT (wax appearance temperature), paraffin deposition rate, viscosity and/or cold filter plugging point (CFPP).

Preferred cold flow improvers I) are, for example, i) copolymers of ethylene and ethylenically unsaturated esters, ethers and/or alkenes, ii) homo- or copolymers of $C_{10}$-$C_{30}$-alkyl-bearing esters, amides and/or imides of ethylenically unsaturated carboxylic acids, iii) ethylene copolymers grafted with ethylenically unsaturated esters and/or ethers, iv) homo- and copolymers of higher olefins, and v) condensation products of phenols bearing at least one alkyl radical and aldehydes and/or ketones.

Suitable copolymers of ethylene and ethylenically unsaturated esters, ethers or alkenes i) are especially those that contain, as well as ethylene, 4 to 18 mol %, especially 6 to 15 mol %, of at least one vinyl ester, acrylic ester, methacrylic ester, alkyl vinyl ether and/or alkene.

The vinyl esters are preferably those of the formula (1)

$$CH_2=CH-OCOR^1 \quad (1)$$

in which $R^1$ is $C_1$- to $C_{30}$-alkyl, preferably $C_4$- to $C_{16}$-alkyl and especially $C_6$- to $C_{12}$-alkyl, for example $C_1$- to $C_{16}$-alkyl or $C_1$- to $C_{12}$-alkyl.

The alkyl radicals may be linear or branched. In a preferred embodiment, they are linear alkyl radicals having 1 to 18 carbon atoms and especially having 1 to 12 carbon atoms. In a further preferred embodiment, $R^1$ is a branched alkyl radical having 3 to 30 carbon atoms and preferably having 5 to 16 carbon atoms. Particularly preferred vinyl esters derive from secondary and especially tertiary carboxylic acids, the branch of which is in the alpha position to the carbonyl group. Especially preferred here are the vinyl esters of tertiary carboxylic acids which are also referred to as Versatic acid vinyl esters and which have neoalkyl radicals having 5 to 12 carbon atoms, especially having 8, 9, 10 or 11 carbon atoms. Suitable vinyl esters include vinyl acetate, vinyl propionate, vinyl butyrate, vinyl isobutyrate, vinyl hexanoate, vinyl heptanoate, vinyl octanoate, vinyl pivalate, vinyl 2-ethylhexanoate, vinyl laurate, vinyl stearate and Versatic esters such as vinyl neononanoate, vinyl neodecanoate, vinyl neoundecanoate. An especially preferred vinyl ester is vinyl acetate.

In a further embodiment, the alkyl groups mentioned may be substituted by one or more hydroxyl groups.

In a further preferred embodiment, these ethylene copolymers contain vinyl acetate and at least one further vinyl ester of the formula (1) in which $R^1$ is $C_4$- to $C_{30}$-alkyl, preferably $C_4$- to $C_{16}$-alkyl, especially $C_6$- to $C_{12}$-alkyl. Preferred further vinyl esters are the above-described vinyl esters of this chain length range.

The acrylic and methacrylic esters are preferably those of the formula (2)

$$CH_2=CR^2-COOR^3 \quad (2)$$

in which $R^2$ is hydrogen or methyl and $R^3$ is $C_1$- to $C_{30}$-alkyl, preferably $C_4$- to $C_{16}$-alkyl and especially $C_6$- to $C_{12}$-alkyl, for example $C_1$- to $C_{16}$-alkyl, $C_1$- to $C_{12}$-alkyl, $C_4$- to $C_{30}$-alkyl, $C_4$- to $C_{12}$-alkyl, $C_6$- to $C_{30}$-alkyl or $C_6$- to $C_{16}$-alkyl.

The alkyl radicals may be linear or branched. In a preferred embodiment, they are linear. In a further preferred embodiment, they have a branch in the 2 position to the ester moiety. Suitable acrylic esters include, for example, methyl (meth)acrylate, ethyl (meth)acrylate, propyl (meth)acrylate, n- and isobutyl (meth)acrylate, hexyl (meth)acrylate, octyl (meth)acrylate, 2-ethylhexyl (meth)acrylate, 2-propylheptyl (meth)acrylate, 4-methyl-2-propylhexyl (meth)acrylate, decyl (meth)acrylate, dodecyl (meth)acrylate, tetradecyl (meth)acrylate, hexadecyl (meth)acrylate, octadecyl (meth)acrylate and mixtures of these comonomers, where the term "(meth)acrylate" encompasses the corresponding esters of acrylic acid and methacrylic acid.

The alkyl vinyl ethers are preferably compounds of the formula (3)

$$CH_2=CH-OR^4 \quad (3)$$

in which $R^4$ is $C_1$- to $C_{30}$-alkyl, preferably $C_4$- to $C_{16}$-alkyl and especially $C_6$- to $C_{12}$-alkyl, for example $C_1$- to $C_{16}$-alkyl, $C_1$- to $C_{12}$-alkyl, $C_4$- to $C_{30}$-alkyl, $C_4$- to $C_{12}$-alkyl, $C_6$- to $C_{30}$-alkyl or $C_6$- to $C_{16}$-alkyl.

The alkyl radicals may be linear or branched. Examples include methyl vinyl ether, ethyl vinyl ether, isobutyl vinyl ether.

The alkenes are preferably monounsaturated hydrocarbons having 3 to 30 carbon atoms, particularly 4 to 16 carbon atoms and especially 5 to 12 carbon atoms. Suitable alkenes include propene, butene, isobutene, pentene, hexene, 4-methylpentene, heptene, octene, decene, diisobutylene, and norbornene and derivatives thereof such as methylnorbornene and vinylnorbornene.

The alkyl radicals $R^1$, $R^3$ and $R^4$ may bear, in minor amounts, functional groups, for example amino, amido, nitro, cyano, hydroxyl, keto, carbonyl, carboxyl, ester, sulfo groups and/or halogen atoms, provided that these do not significantly impair the hydrocarbon character of the radicals mentioned. In a preferred embodiment, however, the alkyl radicals $R^1$, $R^3$ and $R^4$ do not bear any basic functional groups and especially none that contain nitrogen.

Particularly preferred terpolymers contain, apart from ethylene, preferably 3.5 to 17 mol %, especially 5 to 15 mol %, for example 3.5 to 15 mol % or 5 to 17 mol %, of vinyl acetate and 0.1 to 10 mol %, especially 0.2 to 5 mol %, for example 0.1 to 5 mol % or 0.2 to 10 mol %, of at least one long-chain vinyl ester, (meth)acrylic ester and/or alkene, where the total comonomer content is between 4 and 18 mol % and preferably between 7 and 15 mol %, for example between 4 and 17 mol % or between 7 and 18 mol %. Particularly preferred termonomers here are vinyl 2-ethylhexanoate, vinyl neononanoate and vinyl neodecanoate. Further particularly preferred copolymers contain, as well as ethylene and 3.5 to 17.5 mol % of vinyl esters, also 0.1 to 10 mol % of olefins such as propene, butene, isobutene, hexene, 4-methylpentene, octene, diisobutylene, norbornene and/or styrene.

The number-average molecular weight of preferred ethylene copolymers i) determined by means of GPC against poly(styrene) standards is between 1000 and 100 000 g/mol, more preferably between 2500 and 50 000 g/mol and especially between 5000 and 20 000 g/mol, for example between 1000 and 50 000 g/mol, between 1000 and 20 000 g/mol, between 2500 and 100 000 g/mol, between 2500 and 20 000 g/mol, between 5000 and 100 000 g/mol or between 5000 and 50 000 g/mol. The $MFI_{190}$ values of particular preferred ethylene copolymers i) measured according to DIN 53735 at 190° C. with an applied force of 2.16 kg are between 0.1 and 1200 g/10 min, particularly between 1 and 900 g/10 min and especially between 2 and 500 g/10 min, for example between 0.1 and 900 g/10 min, between 0.1 and 500 g/10 min, between 1 and 1200 g/10 min, between 1 and 500 g/10 min, between 2 and 1200 g/10 min or between 2 and 900 g/10 min. The degrees of branching determined by means of $^1$H NMR spectroscopy are preferably between 1 and 9 $CH_3/100$ $CH_2$ groups, especially between 2 and 6 $CH_3/100$ $CH_2$ groups, which do not originate from the comonomers.

Preference is given to using mixtures of two or more of the abovementioned ethylene copolymers. More preferably, the polymers underlying the mixtures differ in at least one characteristic. For example, they may contain different comonomers or have different comonomer contents, molecular weights and/or degrees of branching.

The copolymers i) are prepared by known processes (in this regard cf., for example, Ullmanns Encyclopadie der Technischen Chemie [Ullmann's Encyclopedia of Industrial Chemistry], 5th edition, Vol. A 21, pages 305 to 413). Suitable methods are polymerization in solution, in suspension, in the gas phase and high-pressure bulk polymerization. Preference is given to employing high-pressure bulk polymerization which is conducted at pressures of 50 to 400 MPa, preferably 100 to 300 MPa, and temperatures of 50 to 350° C., preferably 100 to 300° C. The reaction of the comonomers is initiated by initiators that form free radicals (free-radical chain initiators). This substance class includes, for example, oxygen, hydroperoxides, peroxides and azo compounds, such as cumene hydroperoxide, t-butyl hydroperoxide, dilauroyl peroxide, dibenzoyl peroxide, bis(2-ethylhexyl) peroxodicarbonate, t-butyl permaleate, t-butyl perbenzoate, dicumyl peroxide, t-butyl cumyl peroxide, di(t-butyl) peroxide, 2,2'-azobis(2-methylpropanonitrile), 2,2'-azobis(2-methylbutyronitrile). The initiators are used individually or as a mixture of two or more substances in amounts of 0.01% to 20% by weight, preferably 0.05% to 10% by weight, for example 0.01% to 10% by weight, based on the comonomer mixture.

For a given composition of the comonomer mixture, the desired molecular weight of the copolymers i) is established by variation of the reaction parameters of pressure and temperature and if appropriate by addition of moderators. Useful moderators have been found to be hydrogen, saturated and unsaturated hydrocarbons, for example propane and propene, aldehydes, for example propionaldehyde, n-butyraldehyde and isobutyraldehyde, ketones, for example acetone, methyl ethyl ketone, methyl isobutyl ketone and cyclohexanone, or alcohols, for example butanol. Depending on the desired viscosity, the moderators are employed in amounts up to 20% by weight, preferably 0.05% to 10% by weight, based on the comonomer mixture.

High-pressure bulk polymerization is conducted batchwise or continuously in known high-pressure reactors, for example autoclaves or tubular reactors; tubular reactors have been found to be particularly useful. Solvents such as aliphatic, aromatic and/or alkylaromatic hydrocarbons or hydrocarbon mixtures, for example toluene or xylene, may be present in the reaction mixture, although the solvent-free mode of operation has been found to be particularly useful. In a preferred embodiment of the polymerization, the mixture of the comonomers, the initiator and, if used, the moderator is fed to a tubular reactor via the reactor inlet or via one or more side branches. In this case, the comonomer streams may be of different composition (EP-B-0271738).

Suitable homo- or copolymers of $C_{10}$-$C_{30}$-alkyl-bearing esters and amides of ethylenically unsaturated carboxylic acids (ii) are especially those that contain repeating structural elements of the formula (4)

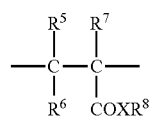

(4)

where
$R^5$ and $R^6$ are independently hydrogen, phenyl or a group of the formula $COXR^9$,
$R^7$ is hydrogen, methyl or a group of the formula —$CH_2COXR^9$,
$R^8$ is a $C_{10}$- to $C_{30}$-alkyl or alkylene radical, preferably a $C_{12}$- to $C_{26}$-alkyl or alkylene radical, for example a $C_{10}$- to $C_{26}$-alkyl or alkylene radical or a $C_{12}$- to $C_{30}$-alkyl or alkylene radical,
$R^9$ is hydrogen or $R^8$ and
X is O, NH or $NR^8$,
with the proviso that these repeating structural units contain at least one and at most two ester and/or amide units derived from a carboxylic acid in one structural element.

Particularly suitable homo- and copolymers are those in which $R^5$ and $R^6$ are hydrogen, X is O and $R^7$ is hydrogen or methyl. These structural units derive from esters of ethylenically unsaturated monocarboxylic acids, for example acrylic acid, methacrylic acid or cinnamic acid.

Also particularly suitable are copolymers in which one of $R^5$ and $R^6$ is hydrogen and the other is a group of the formula $COXR^9$ and $R^7$ is hydrogen, or in which $R^5$ and $R^6$ are hydrogen and $R^7$ is a group of the formula —$CH_2COXR^9$. These structural units derive from monoesters, diesters, monoamides, diamides and ester amides of dicarboxylic acids, for example maleic acid, fumaric acid and itaconic acid. Monoesters and monoamides of dicarboxylic acids are obtainable, for example, by incomplete reaction of the dicarboxylic acid or anhydride thereof with an amine and/or ester. Preferred monoesters and monoamides form, for example, through reaction of a dicarboxylic acid with 1 or 2 equivalents of alcohol or amine, resulting in free carboxyl groups. Particular preference is given to the esters of copolymers of maleic acid and of fumaric acid.

Alcohols suitable for the esterification of the ethylenically unsaturated mono- and dicarboxylic acids are those having 10 to 50 carbon atoms, more preferably those having 12 to 30 carbon atoms and especially those having 18 to 24 carbon atoms, for example those having 10 to 30 carbon atoms, having 10 to 24 carbon atoms, having 12 to 50 carbon atoms, having 12 to 24 carbon atoms, having 18 to 50 carbon atoms or having 18 to 30 carbon atoms. They may be of natural or synthetic origin. The alkyl radicals here are preferably linear or at least very substantially linear. Suitable fatty alcohols include 1-decanol, 1-dodecanol, 1-tridecanol, isotridecanol, 1-tetradecanol, 1-hexadecanol, 1-octadecanol, eicosanol, docosanol, tetracosanol, hexacosanol and naturally occurring mixtures, for example coconut fatty alcohol, tallow fatty alcohol, hydrogenated tallow fatty alcohol and behenyl alcohol. In a preferred embodiment, mixtures of the linear fatty alcohols mentioned with one or branched alcohols have been found to be useful. Preferred branched alcohols have carbon atoms within the abovementioned range. Further preferably, they bear an alkyl radical having 6 to 20 carbon atoms in the 2 position to the hydroxyl group. Examples of preferred branched alcohols are Guerbet alcohols such as 2-dodecylhexadecanol, 2-octyldodecanol and 2-tetradecyloctadecanol. Preferably, the proportion of branched alcohols in the total amount of alcohols is between 1 and 50 mol % and especially between 5 and 30 mol %, for example between 1 and 30 mol % or between 5 and 50 mol %.

Fatty amines suitable for the amidation of the ethylenically unsaturated mono- and dicarboxylic acids are those having 10 to 30 carbon atoms, more preferably those having 12 to 26 carbon atoms and especially those having 18 to 24 carbon atoms, for example those having 10 to 16 carbon atoms, having 10 to 24 carbon atoms, having 12 to 30 carbon atoms, having 12 to 24 carbon atoms, having 18 to 30 carbon atoms or having 18 to 26 carbon atoms. They may be of natural or synthetic origin. The alkyl radicals here are preferably linear or at least very substantially linear. Suitable fatty amines include tetradecylamine, hexadecylamine, octadecylamine, behenylamine and oleylamine. The reaction of copolymers of maleic acid and fumaric acid with primary amines can also give rise to cyclic imides, which are likewise suitable as cold flow improvers for mineral oils in the context of this invention.

The copolymers of constituent ii) may contain various units of the formula (4). In addition, as well as the structural elements of the formula (4), they may comprise further comonomers such as vinyl esters of the formula (1), shorter-chain (meth)acrylic esters of the formula (2), alkyl vinyl ethers of the formula (3) and/or alkenes. Preferred vinyl esters conform to the definition given for formula (1). Particular preference is given to vinyl acetate. Preferred alkenes are α-olefins, i.e. linear olefins having a terminal double bond, preferably having chain lengths of 3 to 50, more preferably having 6 to 36, particularly having 10 to 30 and especially having 18 to 24 carbon atoms, for example having 3 to 36, having 3 to 30, having 3 to 24, having 6 to 50, having 6 to 30, having 6 to 24, having 10 to 50, having 10 to 36, having 10 to 24, having 18 to 50, having 18 to 36 or having 18 to 30 carbon atoms. Examples of suitable α-olefins are propene, 1-butene, isobutene, 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetracosene. Likewise suitable are commercially available chain cuts, for example $C_{13-18}$-α-olefins, $C_{12-16}$-α-olefins, $C_{14-16}$-α-olefins, $C_{14-18}$-α-olefins, $C_{16-18}$-α-olefins, $C_{16-20}$-α-olefins, $C_{22-28}$-α-olefins, $C_{30+}$-α-olefins.

Also especially suitable as comonomers in constituent ii) are ethylenically unsaturated compounds that bear heteroatoms, for example allyl polyglycols, benzyl acrylate, hydroxyethyl acrylate, hydroxypropyl acrylate, hydroxybutyl acrylate, dimethylaminoethyl acrylate, perfluoroalkyl acrylate, and the corresponding esters and amides of methacrylic acid, vinylpyridine, vinylpyrrolidone, acrylic acid, methacrylic acid, p-acetoxystyrene and vinyl methoxyacetate. The proportion thereof in the polymer is preferably below 20 mol %, especially between 1 and 15 mol %, for example between 2 and 10 mol %.

In a preferred embodiment of the invention, allyl polyglycols suitable as comonomers may comprise 1 to 50 ethoxy or propoxy units and conform to the formula (5):

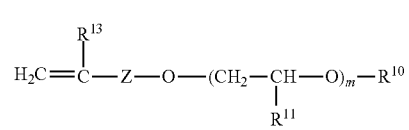

(5)

in which
$R^{13}$ is hydrogen or methyl,
Z is $C_1$-$C_3$-alkyl,
$R^{10}$ is hydrogen, $C_1$-$C_{30}$-alkyl, cycloalkyl, aryl or —C(O)—$R^{12}$
$R^{11}$ is hydrogen or $C_1$-$C_{20}$-alkyl,
$R^{12}$ is $C_1$-$C_{30}$-alkyl, $C_3$-$C_{30}$-alkenyl, cycloalkyl or aryl and
m is a number from 1 to 50, preferably 1 to 30.

Particular preference is given to comonomers of the formula 5 in which $R^{13}$ and $R^{11}$ is hydrogen and $R^{10}$ is hydrogen or $C_1$-$C_4$-alkyl groups.

Preferred copolymers ii) contain at least 10 mol %, more preferably 20 to 95 mol %, particularly 30 to 80 mol % and especially 40 to 60 mol %, for example 10 to 95 mol %, 10 to 80 mol %, 10 to 60 mol %, 20 to 80 mol %, 20 to 60 mol %, 30 to 95 mol %, 30 to 60 mol %, 40 to 95 mol % or 40 to 80 mol % of at least one structural unit of the formula (4). In a specific embodiment, the cold flow improvers ii) consist of structural units of the formula (4).

Preferred homo- or copolymers of $C_{10}$-$C_{30}$-alkyl-bearing esters of ethylenically unsaturated carboxylic acids ii) are, for example, poly(alkyl acrylates), poly(alkyl methacrylates), copolymers of alkyl (meth)acrylates with vinylpyridine, copolymers of alkyl (meth)acrylates with allyl polyglycols, esterified copolymers of alkyl (meth)acrylates with maleic anhydride, copolymers of esterified ethylenically unsaturated dicarboxylic acids, for example dialkyl maleates or fumarates, with α-olefins, copolymers of esterified ethylenically unsaturated dicarboxylic acids, for example dialkyl maleates or fumarates, with unsaturated vinyl esters, for example vinyl acetate, and also copolymers of esterified ethylenically unsaturated dicarboxylic acids, for example dialkyl maleates or fumarates, with styrene, and the polymers that correspondingly bear amide rather than ester groups. In a preferred embodiment, the copolymers ii) of the invention do not contain any basic comonomers and especially none that contain nitrogen.

The molecular weights or molar mass distributions of preferred copolymers ii) are characterized by a K value (measured according to Fikentscher in 5% solution in toluene) of 10 to 100, preferably 15 to 80. The average molecular weights Mw of preferred copolymers ii) determined by means of gel permeation chromatography GPC against poly(styrene) standards are within a range from 5000 to 1 000 000, preferably from 10 000 to 300 000 and especially from 25 000 to 100 000 daltons, for example in the range from 5000 to 300 000, from 5000 to 100 000, from 10 000 to 1 000 000, from 10 000 to 100 000, from 25 000 to 1 000 000 or from 25 000 to 300 000 daltons.

The copolymers ii) are typically prepared by (co)polymerization of esters and/or amides of ethylenically unsaturated carboxylic acids, especially alkyl acrylates and/or alkyl methacrylates, optionally with further comonomers, by customary free-radical polymerization methods.

A suitable preparation process for preparation of the cold flow improvers ii) involves dissolving the monomers in an organic solvent and polymerizing them in the presence of a free-radical chain initiator at temperatures in the range from 30 to 150° C. Suitable solvents are preferably aromatic hydrocarbons, for example toluene, xylene, trimethylbenzene, dimethylnaphthalene or mixtures of these aromatic hydrocarbons. Commercial mixtures of aromatic hydrocarbons also find use, for example Solvent Naphtha or Shellsol AB®. Suitable solvents are likewise aliphatic hydrocarbons. Alkoxylated aliphatic alcohols or esters thereof, for example butylglycol, also find use as solvents, but preferably as a mixture with aromatic hydrocarbons. In specific cases, a solvent-free polymerization for preparation of the cold flow improvers ii) is also possible.

Free-radical initiators used are typically standard initiators such as azobisisobutyronitrile, esters of peroxycarboxylic acids, for example t-butyl perpivalate and t-butyl per-2-ethylhexanoate, or dibenzoyl peroxide.

A further means of preparation of the cold flow improvers ii) involves the polymer-analogous esterification, transesterification, amidation or aminolysis of already polymerized ethylenically unsaturated carboxylic acids, esters thereof with short chain alcohols or reactive equivalents thereof, for example acid anhydrides, with fatty alcohols and/or fatty amines having 10 to 30 carbon atoms. For example, the transesterification of poly(meth)acrylic acid with fatty alcohols or the esterification of polymers of maleic anhydride and α-olefins with fatty alcohols leads to cold flow improvers ii) suitable in accordance with the invention. Depending on the reaction conditions, the reaction of polymers of maleic anhydride and α-olefins with primary fatty amines can prepare amides or imides. In a preferred embodiment, the anhydride units are reacted with more than one but less than two equivalents of alcohol, so as to form free carboxyl groups on the polymer. Preferred partial esters and partial amides have acid numbers between 19 and 100 mg KOH/g and especially between 25 and 70 mg KOH/g, for example between 19 and 70 mg KOH/g or between 25 and 100 mg KOH/g.

Suitable ethylene copolymers iii) grafted with ethylenically unsaturated esters are, for example, those which comprise
a) an ethylene copolymer containing, as well as ethylene, 4 to 20 mol % and preferably 6 to 18 mol % of at least one vinyl ester, acrylic acid, methacrylic acid, alkyl vinyl ether and/or alkene, onto which has been grafted
b) a homo- or copolymer of an ester of an α,β-unsaturated carboxylic acid with a $C_6$ to $C_{30}$ alcohol.

Particular preference is given to ethylene-vinyl ester copolymers.

In general, the ethylene copolymer a) used as graft base is one of the copolymers described as cold flow improvers i). Ethylene copolymers preferred as copolymer a) for the grafting are especially those which contain, as well as ethylene, 7.5 to 15 mol % of vinyl acetate. In addition, preferred ethylene copolymers a) have $MFI_{190}$ values between 1 and 900 g/10 min and especially between 2 and 500 g/10 min, for example between 1 and 500 g/10 min or 2 and 900 g/10 min. In a preferred embodiment, graft bases used are mixtures of ethylene copolymers a) which differ in at least one characteristic, for example the comonomers present, the comonomer contents, the molecular weights and/or the degrees of branching.

The (co)polymers b) grafted onto the ethylene copolymers a) contain preferably 40% to 100% by weight and especially 50% to 90% by weight, for example 40% to 90% by weight or 50% to 100% by weight, of one or more structural units that derive from alkyl acrylates and/or alkyl methacrylates. Preferably at least 10 mol %, more preferably 20 to 100 mol %, particularly 30 to 90 mol % and especially 40 to 70 mol %, for example 10 to 100 mol %, 10 to 90 mol %, 10 to 70 mol %, 20 to 90 mol %, 20 to 70 mol %, 30 to 100 mol %, 30 to 90 mol %, 40 to 100 mol % or 40 to 90 mol % of the grafted-on structural units bear alkyl radicals having at least 12 carbon atoms. Particularly preferred monomers are alkyl (meth)acrylates having $C_{16}$- to $C_{36}$-alkyl radicals, particularly having $C_{18}$- to $C_{30}$-alkyl radicals and especially having $C_{20}$- to $C_{24}$-alkyl radicals, for example having $C_{12}$- to $C_{36}$-alkyl radicals, having $C_{12}$- to $C_{30}$-alkyl radicals, having $C_{12}$- to $C_{24}$-alkyl radicals, having $C_{16}$- to $C_{30}$-alkyl radicals, having $C_{16}$- to $C_{24}$-alkyl radicals, having $C_{18}$- to $C_{36}$-alkyl radicals or having $C_{18}$- to $C_{24}$-alkyl radicals.

Optionally, the grafted-on polymers b) contain 0% to 60% by weight, preferably 10% to 50% by weight, of one or more further structural units that derive from further ethylenically unsaturated compounds. Suitable further ethylenically unsaturated compounds are, for example, vinyl esters of carboxylic acids having 1 to 20 carbon atoms, α-olefins having 6 to 40 carbon atoms, vinylaromatics, dicarboxylic acids and their anhydrides and esters with $C_{10}$-$C_{30}$ fatty alcohols, acrylic acid, methacrylic acid and especially ethylenically unsaturated compounds bearing heteroatoms, for example benzyl acrylate, hydroxyethyl acrylate, hydroxypropyl acrylate, hydroxybutyl acrylate, p-acetoxystyrene, vinyl methoxyacetate, dimethylaminoethyl acrylate, perfluoroalkyl acrylate, the isomers of vinylpyridine and its derivatives, N-vinylpyrrolidone and (meth)acrylamide and its derivatives such as N-alkyl(meth)acrylamides having $C_1$-$C_{20}$-alkyl radicals. Allyl polyglycols of the formula (5) are also suitable as further ethylenically unsaturated compounds.

The graft polymers ii) usually contain ethylene copolymer a) and homo- or copolymer of an ester of an α,β-unsaturated carboxylic acid with a $C_6$ to $C_{30}$ alcohol b) in a weight ratio of 1:10 to 10:1, preferably of 1:8 to 5:1 and especially of 1:5 to 1:1, for example of 1:10 to 5:1, of 1:10 to 1:1, of 1:8 to 10:1, of 1:8 to 1:1, of 1:5 to 10:1 or of 1:5 to 5:1.

Graft polymers iii) are prepared by known processes. For example, graft polymers iii) are prepared by mixing ethylene copolymer a) and comonomer or comonomer mixture b), optionally in the presence of an organic solvent and with addition of a free-radical chain initiator.

Suitable homo- and copolymers of higher olefins (iv) are polymers of α-olefins having 3 to 30 carbon atoms. These may derive directly from monoethylenically unsaturated monomers or be prepared indirectly by hydrogenation of polymers that derive from polyunsaturated monomers such as isoprene or butadiene. Preferred copolymers contain structural units that derive from α-olefins having 3 to 24 carbon atoms and have molecular weights of up to 120 000 g/mol. Preferred α-olefins are propene, butene, isobutene, n-hexene, isohexene, n-octene, isooctene, n-decene, isodecene. In addition, these polymers may also contain minor amounts of structural units derived from ethylene. These copolymers may also contain small amounts, for example up to 10 mol %, of further comonomers, for example non-terminal olefins or non-conjugated olefins. Particular preference is given to ethylene-propylene copolymers. Also preferred are copolymers of different olefins having 5 to 30 carbon atoms, for example poly(hexene-co-decene). These may be either random copolymers or block copolymers. The olefin homo- and copolymers may be prepared by known methods, for example by means of Ziegler or metallocene catalysts.

Suitable condensation products (resins) formed from phenols bearing at least one alkyl radical and aldehydes and/or ketones v) are especially those polymers comprising structural units having at least one phenolic OH group, i.e. one bonded directly to the aromatic system, and at least one alkyl, alkenyl, alkyl ether or alkyl ester group bonded to the aromatic system.

In a preferred embodiment of the invention, the cold flow improvers v) are oligo- or polymers containing repetitive structural units of the formula (6)

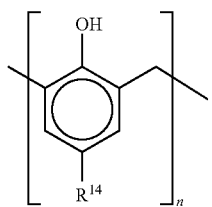

(6)

in which
$R^{14}$ is $C_1$- to $C_{100}$-alkyl, $C_2$- to $—C_{100}$-alkenyl, $O—C_1$- to $O—C_{100}$-alkyl, $O—C_2$- to $O—C_{100}$-alkenyl, $C(O)—O—C_1$- to $C(O)—O—C_{100}$-alkyl, $C(O)—O—C_2$- to $C(O)—O—C_{100}$-alkenyl, $O—C(O)—C_1$- to $O—C(O)—C_{100}$-alkyl or $O—C(O)—C_2$- to $O—C(O)—C_{100}$-alkenyl and
n is a number from 2 to 250.

Preferably, the alkyl and alkenyl radicals of the resins formed from alkyl-bearing phenols and aldehydes and/or ketones have 2 to 60, preferably 4 to 50 and especially 6 to 36 carbon atoms, for example 2 to 50, 2 to 36, 4 to 60, 4 to 36, 6 to 60 or 6 to 50 carbon atoms. The alkyl radicals may be linear or branched. Particularly preferred alkyl radicals having more than 6 carbon atoms preferably have not more than one branch for every 3 carbon atoms, more preferably not more than one branch for every 4 carbon atoms. In a specific embodiment, they are linear. Examples of preferred alkyl radicals are n-, iso- and tert-butyl, n- and isopentyl, n- and isohexyl, n- and isooctyl, n- and isononyl, n- and isodecyl, n- and isododecyl, tetradecyl, hexadecyl, octadecyl, tripropenyl, tetrapropenyl, poly(propenyl) and poly(isobutenyl) radicals, and also essentially linear alkyl radicals derived from commercially available raw materials, for example α-olefin chain cuts or fatty acids within the chain length range of, for example, $C_{13-18}$, $C_{12-16}$, $C_{14-16}$, $C_{14-18}$, $C_{16-18}$, $C_{16-20}$, $C_{22-28}$ and $C_{30+}$.

Preferably, n is a number from 3 to 100, more preferably a number from 5 to 50 and especially a number from 10 to 35, for example a number from 2 to 100, a number from 2 to 50, a number from 2 to 35, a number from 3 to 250, a number from 3 to 50, a number from 3 to 35, a number from 5 to 250, a number from 5 to 100, a number from 5 to 35, a number from 10 to 250, a number from 10 to 100 or a number from 10 to 50.

The molecular weight of the cold flow improvers v) may vary within broad limits. However, it is a prerequisite for suitability in accordance with the invention that they are oil-soluble at least in application-relevant concentrations of 0.001% to 1% by weight. Preferably, the weight-average molecular weight Mw measured by means of gel permeation chromatography (GPC) against polystyrene standards in THF is between 800 and 50 000 g/mol, more preferably between 1500 and 30 000 g/mol and especially between 2000 and 20 000 g/mol, for example between 800 and 30 000 g/mol, between 800 and 20 000 g/mol, between 1500 and 50 000 g/mol, between 1500 and 30 000 g/mol, between 2000 and 50 000 g/mol or between 2000 and 30 000 g/mol.

Suitable aldehydes for the preparation of the resins from phenols bearing at least one alkyl radical and aldehydes and/or ketones v) are those having 1 to 12 carbon atoms and preferably those having 1 to 4 carbon atoms, for example formaldehyde, acetaldehyde, propionaldehyde, butyraldehyde, 2-ethylhexanal, benzaldehyde, glyoxalic acid and their reactive equivalents such as formalin, paraformaldehyde and trioxane. Particular preference is given to formaldehyde.

The resins formed from phenols bearing an alkyl radical and aldehydes and/or ketones (v) that are suitable in accordance with the invention are obtainable by known methods, for example by condensation of the corresponding phenols bearing an alkyl radical with formaldehyde, for example with 0.5 to 1.5 mol, preferably 0.8 to 1.2 mol, of formaldehyde per mole of alkylphenol, for example 0.5 to 1.2 mol or 0.8 to 1.5 mol of formaldehyde per mole of alkylphenol. The condensation can be effected without solvent, but is preferably effected in the presence of an inert organic solvent of zero or only partial water miscibility, such as mineral oils, alcohols, ethers and the like. Other suitable reaction media are solvents based on biogenic raw materials such as fatty acid methyl esters.

The condensation is preferably effected in the organic, water-immiscible solvent II). Particular preference is given here to solvents that can form azeotropes with water. Solvents of this kind that are used are especially aromatic hydrocarbons such as toluene, xylene, diethylbenzene and higher-boiling commercial solvent mixtures such as Shellsol® AB and Solvent Naphtha. The condensation is preferably effected between 70 and 200° C., for example between 90 and 160° C. It is typically catalysed by 0.05% to 5% by weight of bases or preferably acids.

Preferred condensation products v) derive from phenols bearing alkyl radicals and having one or two alkyl radicals in the ortho and/or para position to the OH group. Particularly preferred starting materials are phenols bearing alkyl radicals and bearing at least two hydrogen atoms capable of condensation with aldehydes on the aromatic system, and especially monosubstituted phenols wherein the alkyl radical is bonded in the para position. The alkyl radicals in the condensation products suitable in accordance with the invention that are formed from phenols bearing alkyl radicals and aldehydes may be the same or different. They may be saturated or unsaturated; they are preferably saturated.

In a preferred embodiment, the condensation products of the phenols bearing at least one alkyl radical and aldehydes and/or ketones (v) are alkylphenol-aldehyde resins. Alkylphenol-aldehyde resins are known in principle and are described, for example, in Rompp Chemie Lexikon [Rompp's Chemical Lexicon], 9th edition, Thieme Verlag 1988-92, volume 4, p. 3351 ff. Particularly suitable alkylphenol-aldehyde resins v) derive from alkylphenols having linear alkyl radicals in the chain length range from $C_{20}$ to $C_{36}$. Further particularly preferred alkylphenol-aldehyde resins v) derive from alkylphenols having branched alkyl radicals having 8 and 9 carbon atoms.

In a preferred embodiment, the chain ends of the condensation products formed from phenols bearing at least one alkyl radical and aldehydes and/or ketones are modified after or during the condensation, for example by condensation in the presence of unsaturated fatty acids or fatty acid derivatives or by subsequent reaction with an amine in the presence of further phenol bearing at least one alkyl radical and aldehyde in the manner of a Mannich reaction.

The various cold flow improvers (i) to (v) can be used alone or as a mixture of different cold flow improvers from one or more groups. When multiple flow improvers from one group are used, the components differ in at least one feature, for example the molecular weight, the comonomer content or the type of comonomers. When flow improvers from multiple groups are used, the components may be selected, for example, from groups (i) and (ii), (i) and (iii), (i) and (iv), (i) and (v), (ii) and (iii), (ii) and (iv), (ii) and (v), (iii) and (iv), (iii) and (v) oder (iv) and (v). In the case of mixtures, the individual components are typically used with a proportion of 5% to 95% by weight, for example 20% to 90% by weight, based on the total amount of cold flow improver (I) used.

Preferably, the dispersions of the invention contain 5% to 60% by weight of at least one cold flow improver (I), for example 10% to 50% by weight and especially 15% to 40% by weight, for example 5% to 50% by weight, 5% to 40% by weight, 10% to 60% by weight, 10% to 40% by weight, 15% to 60% by weight or 15% to 50% by weight.

To increase efficacy, it has often been found to be useful to dilute the cold flow improver (I) in a water-immiscible organic solvent (II). Cold flow improver (I) and water-immiscible organic solvent (II) are preferably used here in a weight ratio of (I) to (II) of 1:5 to 5:1, preferably 1:3 to 3:1 and especially 1:2 to 2:1, for example 1:5 to 3:1, 1:5 to 2:1, 1:3 to 5:1, 1:3 to 2:1 or 1:2 to 5:1 or 1:2 to 3:1. The proportion of the water-immiscible organic solvent (II) in the dispersions of the invention is preferably between 5% and 50% by weight and particularly between 8% and 40% by weight and especially between 10% and 30% by weight, for example between 5% and 40% by weight, between 5% and 30% by weight, between 8% and 50% by weight, between 8% and 30% by weight, between 10% and 50% by weight or between 10% and 40% by weight.

Particularly useful water-immiscible solvents (II) have been found to be aliphatic, aromatic and alkylaromatic hydrocarbons and mixtures thereof. In these solvents, the cold flow improvers (I) usable in accordance with the invention are soluble at least to an extent of 20% by weight and often even completely at temperatures above 50° C. Preferred solvents do not contain any polar groups in the molecule. Preferred solvents have boiling points that permit a minimum level of apparatus complexity at the temperature of 60° C. or more required for the preparation of the dispersions according to the invention, meaning that they are to have boiling points of at least 60° C. and preferably of 80 to 200° C. under standard conditions. Examples of suitable solvents are: decane, toluene, xylene, diethylbenzene, naphthalene, tetralin, decalin, and commercial solvent mixtures such as Shellsol®, Exxsol®, Isopar® and Solvesso® products, Solvent Naphtha and/or kerosene. In a preferred embodiment, the water-immiscible solvents comprise at least 10% by weight, preferably 20% to 100% by weight and especially 30% to 90% by weight, for example 10% to 100% by weight, 10% to 90% by weight, 20% to 90% by weight or 30% to 100% by weight, of aromatic constituents. These solvents can also be used for the preparation of the cold flow improvers used in accordance with the invention.

Ethercarboxylic acids and salts thereof (IIIi) are understood to mean organic carboxylic acids and salts thereof which, as well as the carboxyl function, bear one or more ether bridges. Ethercarboxylic acids preferred for the preparation of the dispersant III) conform to the general formula (7)

$$R^{15}-(O-C_xH_{2x})_y-OCH_2COOH \qquad (7)$$

in which $R^{15}$ is a linear or branched alkyl or alkenyl group having 4 to 24 carbon atoms, an alkylaryl group wherein the alkyl radical has 1 to 24 carbon atoms, or an aryl group, x is the number 2 and/or 3 and y is a number from 0 to 20.

Preferred alkyl radicals $R^{15}$ have 6 to 20 carbon atoms and especially 8 to 18 carbon atoms, for example 4 to 20 carbon atoms, 4 to 18 carbon atoms, 6 to 24 carbon atoms, 6 to 18 carbon atoms, 8 to 14 carbon atoms or 8 to 20 carbon atoms. Examples of particularly preferred alkyl radicals are nonyl, isononyl, decyl, isodecyl, tridecyl, isotridecyl, hexadecyl and octadecyl radicals. Preferred aryl radicals $R^{15}$ have 6 to 12 carbon atoms and 1 or two ring systems, for example the phenyl radical. In preferred alkylaryl groups $R^{15}$, the aryl groups are mono- or bicyclic and have 6 to 12 carbon atoms. Alkylaryl groups $R^{15}$ bear at least one linear or branched alkyl radical having 1 to 24 carbon atoms, preferably having 4 to 20 carbon atoms and especially having 6 to 18 carbon atoms, for example having 1 to 20 carbon atoms, having 1 to 18 carbon atoms, having 4 to 24 carbon atoms, having 4 to 18 carbon atoms, having 6 to 24 carbon atoms or having 6 to 20 carbon atoms.

Methods of preparing ethercarboxylic acids of the formula (7) are familiar to the person skilled in the art. Standard preparation processes are, for example, the alkylation of alcohol ethoxylates or propoxylates and especially fatty alcohol ethoxylates or propoxylates with chloroacetic acid derivatives, for example chloroacetic acid (Williamson ether synthesis) and the oxidation of the abovementioned starting materials with various oxidizing agents (atmospheric oxygen, hypochlorite, chlorite) under catalysis by various catalysts.

A first method of preparing ethercarboxylic acids of the formula (7) is the alkylation of alkoxylated fatty alcohols by Williamson synthesis. For this purpose, a fatty alcohol of the formula $R^{15}$—OH is first reacted using noncatalytic amounts of alkali (NaOH, KOH, alkoxides above 5 mol %) with alkylene oxides, preferably with ethylene oxide and/or propylene oxide, to give a polyalkoxy alcohol or fatty alcohol alkoxylate of the general formula (8)

$$R^{15}-(O-C_xH_{2x})_y-OCH_2CH_2OH \qquad (8)$$

in which $R^{15}$, x and y are as defined above. The resulting reaction mixtures that consist of a mixture of ethoxylated alcohols and alkoxides of various polyalkylene glycol ethers are subsequently converted to the corresponding ethercarboxylic acid derivative in a Williamson synthesis with a chloroacetic acid derivative, for example sodium chloroacetate. In many cases, it has been found to be useful to use fatty alcohol ethoxylates having a narrow-range distribution for preparation of the ethercarboxylic acid, these having an advantageous profile of properties and especially better solubility.

In a further method, ethercarboxylic acids of the formula (7), for example according to EP 0304763, can be prepared by oxidation of polyalkoxy alcohols or fatty alcohol alkoxylates of the formula (8) in a liquid, especially aqueous alkaline, phase with oxygen or oxygen-containing gases in the presence of effective amounts of a catalyst composed of precious metals of transition group VIII of the Periodic Table or compounds of these precious metals and optionally a catalyst/activator.

According to the invention, the ethercarboxylic acids are used in the form of their salts (IIIi). These are preferably alkali metal, alkaline earth metal and ammonium salts. These can be prepared by reacting ethercarboxylic acids of the formula (7) with bases of the alkali metals and alkaline earth metals or with amines. Preferred alkali metal and alkaline earth metal salts are the hydroxides and carbonates, for example NaOH, KOH, $Mg(OH)_2$, $Na_2CO_3$, $K_2CO_3$ and $MgCO_3$. Preferred ammonium salts derive from ammonia and primary, secondary and tertiary amines.

Preferred primary, secondary and tertiary amines for the preparation of salts (IIIi) preferred in accordance with the invention bear at least one $C_1$- to $C_{10}$-alkyl radical, for example a methyl, ethyl, propyl, butyl, pentyl, hexyl or octyl radical. Alkyl radicals having 3 or more carbon atoms may be linear or branched.

Particularly preferred primary, secondary and tertiary amines for preparation of salts (IIIi) preferred in accordance with the invention bear at least one alkyl radical substituted by a hydroxyl group. Preferred amines conform to the formula (9)

$$NR^{16}R^{17}R^{18} \qquad (9)$$

in which
R$^{16}$ is a hydrocarbyl radical which bears at least one hydroxyl group and has 1 to 10 carbon atoms and
R$^{17}$, R$^{18}$ are independently hydrogen, an optionally substituted hydrocarbyl radical having 1 to 50 carbon atoms and especially $C_1$- to $C_{20}$-alkyl, $C_3$- to $C_{20}$-alkenyl, $C_6$- to $C_{20}$-aryl or R$^{16}$.

R$^{16}$ is preferably a linear or branched alkyl radical bearing at least one hydroxyl group. R$^{16}$ may bear one or more, for example two, three or more, hydroxyl groups. If R$^{17}$ and/or R$^{18}$ are also R$^{16}$, preference is given to amines of the formula (9) that bear a total of at most 5 and especially 1, 2 or 3 hydroxyl groups.

In a preferred embodiment, R$^{16}$ is a group of the formula (10)

$$—(B—O)_p—R^{19} \qquad (10)$$

in which
B is an alkylene radical having 2 to 6 carbon atoms, preferably having 2 or 3 carbon atoms,
p is a number from 1 to 50,
R$^{19}$ is hydrogen, a hydrocarbyl radical having 1 to 50 carbon atoms, especially $C_1$- to $C_{20}$-alkyl, $C_2$- to $C_{20}$-alkenyl, $C_6$- to $C_{20}$-aryl or —B—NH$_2$.

More preferably, B is an alkylene radical having 2 to 5 carbon atoms and especially a group of the formula —CH$_2$—CH$_2$— and/or —CH(CH$_3$)—CH$_2$—.

Preferably, p is a number from 2 to 20 and especially a number from 3 to 10, for example a number from 2 to 10 or from 3 to 20. In a further particularly preferred embodiment, p is 1 or 2. Alkoxy chains with p≥3 and especially with p≥5 may be a block polymer chain having alternating blocks of different alkoxy units, preferably ethoxy and propoxy units. More preferably, —(B—O)$_p$— is a homopolymer.

Particularly suitable are alkanolamines in which R$^{16}$ and R$^{17}$ are independently a group of the formula —(B—O)$_p$—H and R$^{18}$ is H, in which the definitions of B and p in R$^{16}$ and R$^{17}$ may be the same or different. More particularly, the definitions of R$^{16}$ and R$^{17}$ here are the same.

In a further particularly preferred embodiment, R$^{16}$, R$^{17}$ and R$^{18}$ are independently a group of the formula —(B—O)$_p$—H in which the definitions of B and p in R$^{16}$, R$^{17}$ and R$^{18}$ may be the same or different. More particularly, the definitions of R$^{16}$, R$^{17}$ and R$^{18}$ here are the same.

Examples of suitable alkylamines are methylamine, ethylamine, propylamine, n-butylamine, tert-butylamine, dimethylamine, diethylamine, dipropylamine, methylethylamine, trimethylamine and triethylamine. Examples of suitable alkanolamines are aminoethanol, 3-amino-1-propanol, isopropanolamine, N-butyldiethanolamine, N,N-diethylaminoethanol, N,N-dimethylisopropanolamine, 2-(2-aminoethoxy)ethanol, 2-amino-2-methyl-1-propanol, 3-amino-2,2-dimethyl-1-propanol, 2-amino-2-hydroxymethylpropane-1,3-diol, diethanolamine, dipropanolamine, diisopropanolamine, di(diethylene glycol)amine, N-butyldiethanolamine, triethanolamine, tripropanolamine, tri(isopropanol)amine, tris(2-hydroxypropylamine), aminoethylethanolamine and poly(ether)amines such as poly(ethylene glycol)amine and poly(propylene glycol)amine each having 4 to 50 alkylene oxide units.

Further compounds suitable as amines of the invention are heterocyclic compounds comprising a cycle which has 5 to 7 ring members and comprises not only a nitrogen atom but also an oxygen atom, and which bears, on the nitrogen atom, an alkyl radical having 1 to 4 carbon atoms or a group of the formula (10)

$$—(B—O)_p—R^{19} \qquad (10)$$

in which
B is an alkylene radical having 2 or 3 carbon atoms, and
p is 1 or 2, and
R$^{19}$ is hydrogen or a group of the formula —B—NH$_2$.

For example, morpholine and its N-alkoxyalkyl derivatives, for example 2-(2-morpholin-4-ylethoxy)ethanol and 2-(2-morpholin-4-ylethoxy)ethylamine, were used successfully for preparation of the dispersions of the invention.

The salts of ethercarboxylic acids (IIIi) can be prepared by reacting an ethercarboxylic acid with an appropriate basic alkali metal or alkaline earth metal salt or an amine. The ethercarboxylic salts (IIIi) may be prepared here in a preceding reaction step or preferably by addition of ethercarboxylic acid and base to the dispersion mixture. For this purpose, basic alkali metal or alkaline earth metal salt and ethercarboxylic acid are preferably used in equimolar amounts, i.e. in a molar ratio between 1.2:1 and 1:1.2 mol/mol, more preferably 1.1:1.1 mol/mol and especially 1:1 mol/mol. Based on the content of acid groups on the one hand and amino groups on the other hand, amine and ethercarboxylic acid are preferably used in a molar ratio of 10:1 to 1:10, preferably of 5:1 to 1:5, especially of 1:2 to 2:1, for example in a ratio of 1.2:1 to 1:1.2. In a particularly preferred embodiment, amine and ethercarboxylic acid, based on the content of acid groups on the one hand and amino groups on the other hand, are used in equimolar amounts.

In a further preferred embodiment, the basic alkali metal or alkaline earth metal salt or amine is used in an amount such that the dispersion of the invention produced therewith has a pH above 6.0, preferably between 6.5 and 12.0, more preferably between 7.0 and 11.0 and especially between 7.2 and 10.0, for example above 6.5, above 7.0, above 7.2, between 6.0 and 12.0, between 6.0 and 11.0, between 6.0 and 10.0, between 7.0 and 12.0, between 7.0 and 10.0, between 7.2 and 12.0 or between 7.2 and 11.0.

For better ease of handling of the ethercarboxylic salts (IIIi), it has been found to be useful to use higher-melting salts in the form of a solution or dispersion in water and/or the water-miscible solvent (V) and/or in a blend with the nonionic surfactant (IIIii).

Nonionic surfactants preferred as dispersants IIIii) have a nonpolar and a polar molecular moiety, where the polar moiety does not contain any dissociable functional groups and therefore does not separate into ions in water. The nonpolar moiety is preferably based on a fatty alcohol, a fatty acid or an alkylphenol; the polar groups are preferably the hydroxyl group and the ether group.

Preferred nonionic surfactants (IIIii) are, for example, 10- to 80-tuply, preferably 20- to 50-tuply, ethoxylated $C_8$- to $C_{20}$-alkanols, $C_8$- to $C_{12}$-alkylphenols, $C_8$ to $C_{20}$ fatty acids and $C_8$ to $C_{20}$ fatty acid amides. Further suitable examples of nonionic surfactants are poly(alkylene oxides) in the form of block copolymers of various alkylene oxides such as ethylene oxide and propylene oxide, and partial esters and amides of polyols or alkanolamines with fatty acids, for example alkyl polyglucosides and N-acylated N-alkylglucamides.

Particular materials that are normally characterized as nonionic surfactants may have structural similarity with particular organic, water-miscible solvents (V) that are suitable in accordance with the invention. Should any distinction between these components be required, a material can be classified as a nonionic surfactant for the purposes of this invention when it has the properties of a nonionic surfactant (for example interfacial activity) and is also a solid at room temperature, preferably at 30° C. and especially at 40° C. Materials that are liquid at these temperatures, especially at room temperature or lower, may be classified as a constituent of the organic, water-miscible solvent (V).

Particularly preferred partial esters of polyols include fatty acid esters of polyols having three or more and particularly having 3 to 12 and especially having 4 to 6 hydroxyl groups, for example polyols having more than four hydroxyl groups, having 3 to 6 hydroxyl groups or 4 to 12 hydroxyl groups. Examples of particularly preferred polyols are glycerol, polyglycerol having an oligomerization level of 2 to 10 and especially 2 to 5, and sugars, for example sorbitan and reaction products thereof with 1 to 20 mol of at least one alkylene oxide per OH group. Preferred alkylene oxides have 2 to 6 carbon atoms, for example ethylene oxide, propylene oxide and mixtures thereof. Polyols having 5 or more carbon atoms may be in open-chain or cyclic form, for example a furanose or pyranose form. Partial esters are understood to mean esters of a polyol with a fatty acid in which at least one hydroxyl group of the polyol has been esterified with a fatty acid and at least one hydroxyl group is free. Fatty acids used with preference for the preparation of the partial esters conform to the formula $R^{20}$—COOH where $R^{20}$ is an aliphatic hydrocarbon radical having 5 to 29 carbon atoms and preferably has the definition given further down. Examples of suitable partial esters of polyols as nonionic surfactants (IIIii) are glycerol monococoate, glycerol monostearate, glycerol monooleate, glycerol dioleate, sorbitan monolaurate, sorbitan monopalmitate, sorbitan monostearate, sorbitan monooleate, sorbitan sesquioleate, sorbitan dioleate and mixtures thereof.

Particularly preferred N-acylated N-alkylglucamides include compounds having an open-chain head group of the formula (11) and also those having a cyclic head group of the formulae (12)-(14)

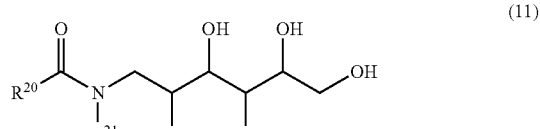

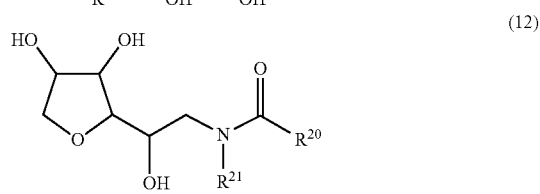

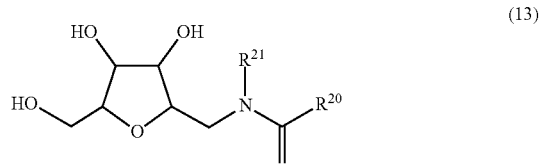

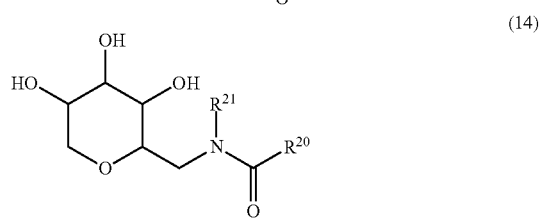

in which
$R^{20}$ is an aliphatic hydrocarbyl radical having 5 to 29 carbon atoms and
$R^{21}$ is an aliphatic hydrocarbyl radical having 1 to 6 carbon atoms, preferably methyl.

In a preferred embodiment, $R^{20}$ is a saturated or unsaturated alkyl radical. These radicals are preferably linear or branched. Further preferably, $R^{20}$ has 6 to 23 carbon atoms and especially 7 to 19 carbon atoms, for example 5 to 23 carbon atoms, 5 to 19 carbon atoms, 6 to 29 carbon atoms, 6 to 19 carbon atoms, 7 to 29 carbon atoms or 7 to 23 carbon atoms. Examples of preferred radicals $R^{20}$ are the n-octyl, isooctyl, n-nonyl, isononyl, n-decyl, isodecyl, dodecyl, isotridecyl, tallow fat alkyl and oleyl radical and mixtures thereof.

In a further preferred embodiment, $R^{21}$ is a $C_1$ or $C_2$ radical and especially methyl.

The nonionic surfactants (IIIii) have HLB values (according to Griffin) above 7, particularly between 8 and 20 and especially between 10 and 18, for example above 8, above 10, between 7 and 20, between 7 and 18, between 8 and 18 or between 10 and 20. Preferred nonionic surfactants promote the formation of oil-in-water (O/W) emulsions. The method of Griffin was published in J. Soc. Cosmet. Chem. 1, 1949, 311-326.

The ethercarboxylic salts (IIIi) and nonionic surfactants (IIIii) can be used as such or in combination with further emulsifiers (coemulsifiers) (VI). For instance, in a preferred embodiment, they are used in combination with anionic, cationic and/or zwitterionic coemulsifiers (VI).

Anionic coemulsifiers contain a lipophilic radical and a polar head group that bears an anionic group, for example a carboxylate, sulfonate or phenoxide group. Typical anionic coemulsifiers include, for example, fatty acid salts of fatty acids having a preferably linear saturated or unsaturated hydrocarbyl radical having 8 to 24 carbon atoms. Preferred salts are the alkali metal, alkaline earth metal and ammonium salts, for example sodium palmitate, potassium oleate, ammonium stearate, diethanolammonium tallowate and triethanolammonium cocoate. Further suitable anionic coemulsifiers are polymeric anionic surfactants, for example based on neutralized copolymers of alkyl (meth)acrylates and (meth)acrylic acid and neutralized partial esters of styrene-maleic acid copolymers. Also suitable as coemulsifiers (VI) are alkyl-, aryl- and alkylarylsulfonates, sulfates of alkoxylated fatty alcohols and alkylphenols, and sulfosuccinates and especially the alkali metal, alkaline earth metal and ammonium salts thereof.

In a preferred embodiment, the anionic coemulsifiers used are alkanolammonium salts of polycyclic carboxylic acids. Particular preference is given to those compounds preparable by neutralization of at least one polycyclic carboxylic acid with at least one alkanolamine. Preferred alkanolamines are the alkanolamines of the formula (9) that have also been mentioned for preparation of ethercarboxylic acid ammonium salts (IIIi). Preferred polycyclic carboxylic acids derive from polycyclic hydrocarbons containing at least two five- and/or six-membered rings bonded to one another via two preferably vicinal carbon atoms. Examples of preferred polycyclic carboxylic acids are acids based on natural resins, for example abietic acid, dihydroabietic acid, tetrahydroabietic acid, dehydroabietic acid, neoabietic acid, pimaric acid, levopimaric acid and palustric acid, and derivatives and mixtures thereof. Also suitable as polycyclic carboxylic acids are mixtures of fused and alkylated cyclopentane- and cyclohexanecarboxylic acids (naphthenic acids) that have been extracted from mineral oils.

Cationic coemulsifiers contain a lipophilic radical and a polar head group that bears a cationic group. Typical cationic coemulsifiers are salts of long-chain primary, secondary or tertiary amines of natural or synthetic origin. Also suitable as cationic coemulsifiers are quaternary ammonium salts, for example tallow fat-derived tetraalkylammonium salts and imidazolinium salts.

Zwitterionic coemulsifiers are understood to mean amphiphiles wherein the polar head group bears both an anionic site and a cationic site that are joined to one another via covalent bonds. Typical zwitterionic coemulsifiers include, for example, N-alkyl N-oxides, N-alkyl betaines and N-alkyl sulfobetaines.

The dispersant (III) containing ethercarboxylic salt (IIIi), nonionic surfactant (IIIii) and optionally further coemulsifiers is added to the dispersions of the invention in a total amount of 0.5% to 12% by weight, more preferably 1% to 8% by weight and especially 2% to 5% by weight, for example 0.5% to 8% by weight, 0.5% to 5% by weight, 1% to 10% by weight, 1% to 5% by weight, 2% to 10% by weight or 2% to 8% by weight, based in each case on the total amount of the dispersion.

The dispersant (III) contains 5% to 95% by weight, preferably 20% to 80% by weight and especially 30% to 70% by weight, for example 5% to 80% by weight, 5% to 70% by weight, 20% to 95% by weight, 20% to 70% by weight, 30% to 95% by weight or 30% to 80% by weight of ethercarboxylic salt (IIIi). In addition, it contains 95% to 5% by weight, preferably 80% to 20% by weight and especially 70% to 30% by weight, for example 95% to 20% by weight, 95% to 30% by weight, 80% to 5% by weight, 80% to 30% by weight, 70% to 5% by weight or 20% to 80% by weight of nonionic surfactant (IIIii). Preferably, the weight ratio between ethercarboxylic salt (IIIi) and nonionic surfactant (IIIii) is between 1:10 and 10:1 and especially between 1:8 and 8:1, for example between 1:10 and 8:1, between 8:1 and 1:10 or between 8:1 and 1:10.

The coemulsifiers (VI), if present, are preferably added in a weight ratio of 1:20 to 2:1 and especially 1:10 to 1:1, for example 1:5 to 1:2, based on the mass of ethercarboxylic salt (IIIi) and nonionic surfactant (IIIii). In a preferred embodiment, the amounts of ethercarboxylic salt (IIIi), nonionic surfactant (IIIii) and coemulsifier (VI) add up to 100% of the dispersant (III). In a specific embodiment, the amounts of ethercarboxylic salt (IIIi) and nonionic surfactant (IIIii) add up to 100% of the dispersant (III).

Suitable water-miscible solvents (V) are preferably those solvents that have high polarity and especially those that have a dielectric constant (relative permittivity $\varepsilon'$) measured at room temperature and 2450 MHz of at least 3 and especially of at least 10. Typically, solvents of this kind contain 10% to 80% by weight of heteroatoms such as nitrogen and/or oxygen. Particular preference is given to oxygen-containing solvents. The relative permittivity $\varepsilon'$ of the solvent describes the ratio of its permittivity E to the permittivity $\varepsilon_0$ of a vacuum ($\varepsilon'=\varepsilon/\varepsilon_0$). The dielectric constants of many solvents are tabulated, for example in Brittany L. Hayes, Microwave Synthesis, CEM Publishing 2002, page 35 and in Arthur von Hippel (ed.): Dielectric Materials and Applications. Technology Press, Boston Mass. et al. 1954 (2nd edition. Artech House, Boston Mass. 1995, pages 362-367).

In the water-miscible solvents (V) and mixtures thereof with water, the cold flow improvers (I) usable in accordance with the invention are essentially insoluble at least at room temperature and often also at temperatures up to 40° C. and in some cases of up to 50° C., meaning that these solvents dissolve the polymers (I) at room temperature preferably to an extent of less than 5% by weight, especially to an extent of less than 2% by weight, for example to an extent of less than 1% by weight.

Preferred water-miscible organic solvents (V) are alcohols having 2 to 14 carbon atoms, glycols having 2 to 10 carbon atoms and poly(glycols) having 2 to 50 monomer units. The glycols and polyglycols may also have been terminally etherified with lower alcohols or esterified with lower fatty acids. However, it is preferable for just one end of the glycol to have been capped. Examples of suitable water-miscible organic solvents are ethylene glycol, diethylene glycol, triethylene glycol, polyethylene glycols, propylene glycol, dipropylene glycol, polypropylene glycols, 1,2-butylene glycol, 1,3-butylene glycol, 1,4-butylene glycol, glycerol, and the monomethyl ethers, monopropyl ethers, monobutyl ethers and monohexyl ethers of these glycols. Examples of further suitable solvents are alcohols (e.g. methanol, ethanol, propanol, isopropanol, butanol, 1-pentanol hexanol, 2-ethylhexanol, diacetone alcohol, 2,6-dimethyl-4-heptanol), acetates (e.g. ethyl acetate, 2-ethoxyethyl acetate), ketones (e.g. acetone, butanone, pentanone, hexanone) and lactones (e.g. butyrolactone). Particularly preferred water-miscible organic solvents (V) are polyols such as ethylene glycol, diethylene glycol and glycerol.

The proportion of the continuous phase formed from water (IV) and the organic, water-miscible solvent (V) in the dispersions of the invention is preferably between 20% and 80% by weight, particularly between 30% and 75% by weight and especially between 40% and 70% by weight, for example between 20% and 75% by weight, between 20% and 70% by weight, between 30% and 80% by weight, between 30% and 70% by weight, between 40% and 80% by weight or between 40% and 75% by weight.

The proportion of the organic, water-miscible solvent (V) in the continuous phase formed by water (IV) and the organic, water-miscible solvent (V) is preferably between 10% and 90% by weight, particularly between 30% and 85% by weight and especially between 50% and 75% by weight, for example between 10% and 85% by weight, between 10% and 75% by weight, between 30% and 90% by weight, between 30% and 75% by weight, between 50% and 90% by weight or between 50% and 85% by weight. The proportion of water (IV) in the continuous phase formed by water (IV) and the organic, water-miscible solvent (V) is preferably between 10% and 90% by weight, particularly between 15% and 70% by weight and especially between 25% and 50% by weight, for example between 10% and 70% by weight, between 10% and 50% by weight, between 15% and 90% by weight, between 15% and 50% by weight, between 25% and 90% by weight or between 25% and 70% by weight. More preferably, the ratio between water and the water-miscible solvent is between 1:8 and 8:1, preferably between 1:5 and 5:1 and especially between 1:3 and 3:1, for example between 1:8 and 5:1, between 1:8 and 3:1, between 1:5 and 8:1, between 1:5 and 3:1 or between 1:3 and 8:1 or 1:3 to 5:1.

The dispersions of the invention preferably contain
5-60% by weight of at least one oil-soluble polymer (I) effective as a cold flow improver for mineral oils
5-40% by weight of at least one organic, water-immiscible solvent (II)
0.5-12% by weightof a dispersant comprising, based on the total amount of dispersant,
  i) 10-90% by weight of at least one salt of an ethercarboxylic acid, and
  ii) 90-10% by weight of at least one nonionic surfactant
20-80% by weight of a continuous phase composed of 10% to 90% by weight of water (IV) and 90% to 10% by weight of at least one organic, water-miscible solvent (V).

More preferably, the dispersions of the invention contain 10% to 50% by weight and especially 25% to 45% by weight, for example 10% to 45% by weight or 25% to 50% by weight, of an oil-soluble polymer (I) effective as a cold flow improver for mineral oils. The proportion of the organic, water-immiscible solvent (II) is preferably between 3% and 30% by weight, particularly between 5% and 25% by weight and especially between 7% and 20% by weight, for example between 3% and 25% by weight, between 3% and 20% by weight, between 5% and 30% by weight, between 5% and 20% by weight, between 7% and 30% by weight or between 8% and 25% by weight, based on the total mass of the dispersion. The water content of the dispersions of the invention is particularly between 10% and 60% by weight and especially between 15% and 50% by weight, for example between 10% and 50% by weight or between 15% and 60% by weight. In a preferred embodiment, the proportion of the organic, water-miscible solvent (V) is between 10% and 70% by weight, particularly between 20% and 60% by weight and especially between 25% and 50% by weight, for example between 10% and 60% by weight, between 10% and 50% by weight, between 20% and 70% by weight, between 20% and 50% by weight, between 25% and 70% by weight or between 25% and 60% by weight, based in each case on the total mass of the dispersion.

For production of the dispersions of the invention, the constituents of the additive of the invention, optionally after prior heating, can be combined and dispersed while heating and stirring. The sequence of addition of the constituents is not crucial. The examples which follow are preferred embodiments, without restricting the production of the dispersions to the processes described.

In a preferred embodiment, the cold flow improver (I) is first dissolved in the water-immiscible solvent (II), optionally while heating. Preference is given here to working at temperatures between 20 and 80° C. and especially at temperatures between the melting point of the polymer or the pour point of the polymer in the solvent used and the boiling point of the solvent. The amount of solvent is preferably such that the solutions contain at least 20% by weight, preferably 25% to 75% by weight and especially 35% to 60% by weight, for example 20% to 75% by weight, 20% to 60% by weight, 25% to 60% by weight or 35% to 75% by weight, of cold flow improver (I) in dissolved form.

In a preferred embodiment, the ethercarboxylic salt (IIIi), the nonionic surfactant (IIIii) and optionally the coemulsifier (VI), and also water and the water-miscible solvent (V) are added to the viscous solution of the cold flow improver (I) in the water-immiscible solvent (II) while stirring and optionally at elevated temperature of, for example, 70 to 90° C. Preferably, the aqueous phase, prior to the addition, is heated to a temperature of 50 to 90° C. and especially to a temperature between 60 and 80° C. The aqueous phase may also be added at higher temperatures, for example temperatures up to 150° C., but in that case it is necessary to work in a closed system under pressure. In a further preferred embodiment, the viscous solution of the cold flow improver (I) in the water-immiscible solvent (II) is dispersed while stirring and optionally at elevated temperature of, for example, 70 to 90° C. in a solution of the ethercarboxylic salt (IIIi), the nonionic surfactant (IIIii) and optionally the coemulsifier (VI) in water and the water-miscible solvent (V).

In a specific embodiment, water and the water-miscible solvent (V) are used in the form of a mixture. Preferably, this mixture, prior to its use, is heated to a temperature between 50 and 100° C. and especially to a temperature between 60 and 80° C.

In a specific embodiment, the ethercarboxylic salt is prepared in situ, for example by reacting the ethercarboxylic acid with an amine of the formula (9). This can also be effected in the polymer solution of (I) and (II) in water, in the water-miscible solvent (V) or in a mixture of water and (IV).

It is also possible to add small amounts of further additives to the dispersion, for example pH regulators, pH buffers, inorganic salts, antioxidants, preservatives, corrosion inhibitors or metal deactivators. For example, it has been found to be useful to add about 0.5% to 1.5% by weight—based on the total mass of the dispersion—of a defoamer, for example an aqueous polysiloxane emulsion.

In practice, it has often been found to be useful to modify the dispersions of the invention, for further prevention both of creaming and of settling-out of dispersed particles, by addition of rheology-modifying substances such that the continuous phase has a low yield point. This yield point is preferably in the order of magnitude of 0.001 to 3 Pa, especially between 0.05 and 1 Pa. In the ideal case, this only slightly affects plastic viscosity, if at all.

Rheology-modifying substances used are preferably water-soluble polymers. As well as block-polymerized ABA poly(alkylene glycols) and poly(alkylene glycol) diesters of long-chain fatty acids, natural, modified and synthetic water-soluble polymers are especially suitable. Preferred ABA-block-poly(alkylene glycols) preferably contain A blocks of poly(propylene glycol) having average molecular weights of 100 to 10 000 D, especially of 150 to 1500 D, and B blocks of poly(ethylene glycol) having average molecular weights of 200 to 20 000 D, especially of 300 to 3000 D. Preferred polyalkylene glycol diesters preferably consist of poly(ethylene glycol) units having an average molecular weight of 100 to 10 000 D, especially of 200 to 750 D. The long-chain fatty acids of the ester preferably bear alkyl radicals having 14 to 30 carbon atoms, especially having 17 to 22 carbon atoms.

Natural or modified natural polymers that are preferred as rheology-modifying substances are, for example, guar, carob seed flour and the modified derivatives thereof, starch, modified starch, for example dextran, xanthan and xeroglucan, cellulose ethers, for example methyl cellulose, carboxymethyl cellulose, hydroxyethyl cellulose and carboxymethyl hydroxyethyl cellulose, and hydrophobically modified, associatively thickening cellulose derivatives and combinations thereof.

Synthetic water-soluble polymers that are particularly preferred as rheology-modifying substances are especially crosslinked and uncrosslinked homo- and copolymers of (meth)acrylic acid and salts thereof, acrylamidopropanesulfonic acid and salts thereof, acrylamide, N-vinylamides, for example N-vinylformamide, N-vinylpyrrolidone or N-vinylcaprolactam. More particularly, the crosslinked and uncrosslinked hydrophobically modified polymers thereof are also of interest as rheology modifiers for formulations of the invention.

Also suitable as rheology-modifying additives are viscoelastic surfactant combinations of nonionic, cationic and zwitterionic surfactants.

Preference is given to adding rheology-modifying substances together with the water. However, they can also be added to the dispersion, preferably prior to shearing. The dispersions of the invention preferably contain, based on the amount of water, 0.01% to 5% by weight and especially 0.05% to 1% by weight of one or more rheology-modifying substances.

In many cases, the stability of the dispersions of the invention is sufficient even without addition of a rheology-modifying substance. Thus, in a particularly preferred embodiment, no rheology-modifying substance is added to the dispersions of the invention.

The dispersions thus produced are flowable and pumpable formulations having excellent storage stability, the viscosity properties of which permit handling at temperatures below −25° C., often at temperatures below −30° C. and in many cases even below −50° C.

To improve the long-term stability of the dispersion, it has been found to be useful to reduce the particle size of the dispersions by means of intense shear. For this purpose, the optionally heated dispersion is exposed to high shear rates of at least $10^3$ $s^{-1}$ and preferably of at least $10^5$ $s^{-1}$, for example of at least $10^6$ $s^{-1}$, as can be generated, for example, by means of gear dispersers (e.g. Ultra-Turrax®), or high-pressure homogenizers with conventional or preferably angled channel architecture (Microfluidizer®). Suitable shear rates are also achievable by means of Cavitron or ultrasound.

The average particle size of the dispersions determined by means of dynamic light scattering is below 50 µm, preferably between 0.005 and 20 µm, particularly between 0.01 and 10 µm and especially between 0.02 and 2 µm, for example between 0.005 and 50 µm, between 0.005 and 10 µm, between 0.005 and 2 µm, between 0.01 and 50 µm, between 0.01 and 20 µm, between 0.01 and 2 µm, between 0.02 and 50 µm, between 0.02 and 20 µm or between 0.02 and 10 µm.

The dispersions of the invention comprising ethercarboxylic salt (IIIi) and nonionic surfactant (IIIii) as dispersant, in spite of a high active ingredient content of up to 60% by weight, are low-viscosity liquids. Their viscosities at −10° C. are typically below 2000 mPa·s, in many cases below 1000 mPa·s and often below 750 mPa·s, for example below 500 mPas. Their intrinsic pour point is typically below −10° C. and in special cases below −25° C. and often below −30° C., for example below −45° C. They can thus be used even under extreme climatic conditions, for example in Arctic regions, and also in offshore applications, without further precautions to counter the solidification of the additives. Owing to their low viscosity, the dispersions of the invention can be pumped even at low temperatures with only low energy expenditure. The restarting of stopped conveying is possible without a problem owing to a very low yield point of the dispersions of the invention even at low temperatures.

Application down-the-hole is also possible without prior dilution of the dispersions and without heating of the conveying conduits. Furthermore, they exhibit excellent long-term stability even at elevated temperatures above 30° C., for example above 45° C., i.e. even above the melting temperature of the dispersed polymer. Even after storage for several weeks and in some cases several months, the dispersions of the invention show only negligible amounts, if any, of coagulate or separated-out solvent. Typically, the proportion of coagulate or separated-out solvent after storage for two months is less than 10% by volume, especially less than 5% by volume and particularly less than 2% by volume, based on the total volume of the dispersions of the invention. Any inhomogeneities that occur can additionally be homogenized again by simple stirring-up.

The dispersions of the invention are especially suitable for improving the cold properties of crude oils and products produced therefrom, for example heating oils, bunker oils, residue oils and mineral oils that contain residue oils. Typically, the additized crude oils and the paraffinic products derived therefrom contain about 10 to 10 000 ppm and preferably 20 to 5000 ppm, for example 50 to 2000 ppm, of the dispersions of the invention. The dispersions of the invention, added in amounts of 10 to 10 000 ppm—based on mineral oil—achieve pour point depressions of frequently more than 10° C., often more than 25° C. and in some cases up to 40° C., both in the case of crude oils and in the case of refined oils, such as lubricant oil or heavy heating oil. Even though they provide the oil-soluble polymeric active ingredient in a medium that is essentially a nonsolvent for this active ingredient, the dispersions of the invention show superior efficacy to the solutions of the pour point depressants in organic solvents that are used.

EXAMPLES

Production of the Dispersions, Variant A

The amounts of cold flow improver and ethercarboxylic acid specified in table 2 were dissolved/homogenized at 80-85° C. in the organic, water-immiscible solvent (xylene, Solvent Naphtha). After addition of an amount of the base equimolar to the ethercarboxylic acid (as a 10% aqueous solution), the mixture was stirred at 80-85° C. for a further 30 minutes, forming an inverse emulsion (W/O). Subsequently, a mixture of the remaining amount of water, the organic, water-miscible solvent and the nonionic surfactant was added, forming a white, low-viscosity dispersion (O/W). If the pH of this dispersion (as a 1% dilution in water) was less than 6, further base was used to adjust it to a pH of >6. Table 2 shows the total amounts of base added to the dispersions and the pH of the dispersion established thereby. After cooling to 50° C., the dispersion was subjected to shear with an Ultra-Turrax® T45 with G45M tool at 21 500 rpm for 2 minutes.

Production of Dispersions, Variant B

The amounts of the starting materials specified in table 2 were metered into a beaker and heated to 80-85° C. If the pH of this dispersion (as a 1% dilution in water) was less than 6, further base was used to adjust it to a pH >6 (as for variant A, table 2 shows the total amounts of base added to the dispersions and the pH values of the dispersions established thereby). This was followed by stirring at this temperature by means of a magnetic stirrer for 1 hour. After cooling to 50° C., the dispersion was subjected to shear with an Ultra-Turrax® T45 with G45M tool at 21 500 rpm for 2 minutes.

TABLE 1

| | | Starting materials used: |
|---|---|---|
| Cold flow improver | PPD 1 | Poly(stearyl acrylate) with K value of 32 (measured according to Fikentscher in 5% toluenic solution) |
| | PPD 2 | Behenyl acrylate-grafted (in a weight ratio of 4:1) ethylene-vinyl acetate copolymer having a vinyl acetate content of 28% by weight and an $MFI_{190}$ of 7 g/10 minutes. |
| | PPD 3 | Stearyl acrylate-grafted (in a weight ratio of 3:1) ethylene-vinyl acetate copolymer having a vinyl acetate content of 28% by weight and an $MFI_{190}$ of 7 g/10 minutes. |
| | PPD 4 | Behenyl alcohol-esterified copolymer of maleic anhydride and $C_{20-24}$-α-olefin, acid number 38 mg KOH/g and weight-average molecular weight Mw of 10 000 g/mol |
| | PPD 5 | Behenyl alcohol-esterified copolymer of maleic anhydride and $C_{20-24}$-α-olefin, acid number 9 mg KOH/g and weight-average molecular weight Mw 11 500 g/mol |
| | PPD 6 | Ethylene-vinyl acetate copolymer having a vinyl acetate content of 25% by weight and a weight-average molecular weight Mw of 100 000 g/mol (measured by means of GPC in THF against poly(styrene) standards) |
| | PPD 7 | $C_{20/24}$-Alkylphenol-formaldehyde resin having a weight-average molecular weight Mw of 5400 g/mol (measured by means of GPC in THF against poly(styrene) standards) |
| Ether-carboxylic acids | ECS 1 | Isotridecanol + 7 EO-ethercarboxylic acid |
| | ECS 2 | Lauryl alcohol + 5 EO-ethercarboxylic acid |
| | ECS 3 | Oleyl alcohol + 8 EO-ethercarboxylic acid |
| | ECS 4 | Oleyl alcohol + 10 EO-ethercarboxylic acid |
| Bases | DEA | diethanolamine |
| | TEA | triethanolamine |
| | KOH | KOH |
| | TEM | triethylamine |
| Nonionic surfactants | NiS 1 | Isotridecanol ethoxylated with 15 mol of ethylene oxide; HLB 15.4 |
| | NiS 2 | Isotridecanol ethoxylated with 2.5 mol of ethylene oxide; HLB 8.2 |
| | NiS 3 | Tri-sec-butylphenol ethoxylated with 30 mol of ethylene oxide; HLB 16 |
| | NiS 4 | N—$C_{12/24}$-Acyl-N-methylglucamide; HLB 11.5 |
| | NiS 5 (C) | Coconut fatty alcohol alkoxylated with 4 mol of ethylene oxide and 4 mol of propylene oxide, HLB 6.0 |
| Water-miscible organic solvent | MEG | monoethylene glycol | Water-immiscible organic solvent | Xyl: | xylene |
| | DEG | diethylene glycol | | SN: | Solvent Naphtha (aromat. solvent mixture with boiling range 185-215° C.) |
| | EtOH | ethanol | | | |
| | IPA | isopropanol | | | |
| | GLY | glycerol | | | |
| | W | water | | | |
| | OA 1 (C) | behenic acid | | | |
| | OA 2 (C) | Mixture of 1 part by weight of polycyclic carboxylic acids (main constituents: abietic acid, neoabietic acid, dehydroabietic acid, palustric acid, pimaric acid and levopimaric acid) and 3 parts by weight of tall oil fatty acid having a fatty acid content of 98%. | | | |

The dispersions were each characterized after shear. Viscosity and yield point were determined with a plate-cone viscometer having a diameter of 35 mm, a cone angle of 4° and a shear rate of 100 s$^{-1}$. The yield point was determined according to DIN EN ISO 3219. The particle sizes and distributions of the dispersions were determined by means of dynamic light scattering (with an instrument of the Mastersizer 2000 type; Malvern Instruments). Melt indices (MFI$_{190}$) of the polymers used were determined according to DIN 53735 at 190° C. with an applied force of 2.16 kg.

Efficacy as Pour Point Depressant

The testing of the efficacy of the dispersions of the invention and the solutions in aromatic solvents that were used for their production was undertaken in various crude oils and residue oils. Pour points were determined according to DIN ISO 3016. The proportions in the crude oils of saturated hydrocarbons (aliphatics), aromatic hydrocarbons (aromatics), resins and asphaltenes were determined by means of a combination of thin-layer chromatography and flame ionization detection in accordance with IP 469 (Iatroscan analysis).

TABLE 2

Composition of the dispersions (amount in g)

| Example | PPD | Hydrophobic solvent (II) | Ethercarboxylic acid | Base | Nonionic surfactant | Water | Hydrophilic solvent (V) | pH | Production variant |
|---|---|---|---|---|---|---|---|---|---|
| 1 | PPD 4 (20) | SN (10) | ECS 3 (1.8) | TEA (1.0) | NiS 2 (2.0) | (38) | MEG (28) | 7.91 | A |
| 2 | PPD 3 (30) | SN (20) | ECS 1 (1.8) | TEA (0.5) | NiS 1 (2.0) | (25) | MEG (21) | 7.37 | A |
| 3 | PPD 3 (25) | SN (17) | ECS 1 (2.7) | DEA (0.5) | NiS 3 (5.0) | (27) | DEG (23) | 6.86 | A |
| 4 | PPD 5 (20) | SN (20) | ECS 1 (1.8) | DEA (0.5) | NiS 1 (2.0) | (30) | MEG (30) | 7.99 | A |
| 5 | PPD 1 (24) | Xyl (16) | ECS 4 (1.8) | TEA (1.0) | NiS 1 (2.0) | (32) | MEG (23) | 7.90 | A |
| 6 | PPD 4 (20) | SN (10) | ECS 1 (2.7) | TEA (1.0) | NiS 1 (2.5) | (27) | MEG (37) | 6.95 | A |
| 7 | PPD 4 (20) | SN (10) | ECS 1 (2.7) | TEA (1.0) | NiS 1 (2.0) | (27) | MEG (37) | 6.34 | B |
| 8 | PPD 3 (25) | SN (17) | ECS 1 (1.8) | TEA (0.5) | NiS 2 (2.0) | (20) | MEG (34) | 7.52 | A |
| 9 | PPD 1 (20) | Xyl (20) | ECS 1 (1.8) | TEA (1.0) | NiS 1 (2.0) | (24) | MEG (31) | 8.01 | A |
| 10 | PPD 5 (20) | SN (20) | ECS 1 (1.8) | DEA (0.5) | NiS 1 (2.0) | (22) | MEG (34) | 8.89 | B |
| 11 | PPD 3 (25) | SN (17) | ECS 1 (1.8) | TEA (0.5) | NiS 2 (2.0) | (20) | MEG (34) | 7.38 | B |
| 12 | PPD 6 (20) | SN (30) | ECS 1 (3.9) | TEA (0.7) | NiS 2 (2.9) | (27) | MEG (15) | 7.31 | A |
| 13 | PPD 7 (15) | SN (20) | ECS 2 (4.0) | DEA (2.0) | NiS 4 (2.5) | (18) | DEG (40) | 7.26 | B |
| 14 | PPD 4 (17) PPD 3 (12) | SN (16) | ECS 1 (1.8) | TEA (1.0) | NiS 1 (2.0) | (28) | MEG (18) | 8.30 | A |
| 15 | PPD 4 (30) | SN (15) | ECS 2 (3.0) | TEA (1.0) | NiS 1 (2.0) | (28) | MEG (35) | 6.72 | A |
| 16 | PPD 6 (20) | SN (30) | ECS 4 (3.0) | KOH (0.4) | NiS 4 (1.8) | (30) | GLY (15) | 7.60 | B |
| 17 | PPD 2 (25) | SN (17) | ECS 4 (2.5) | TEM (0.8) | NiS 4 (1.5) | (25) | DEG (30) | 9.12 | A |
| 18 | PPD 2 (24) | SN (16) | ECS 1 (2.7) | TEA (1.0) | NiS 3 (5.0) | (30) | MEG (21) | 7.95 | A |
| 19 | PPD 2 (25) | SN (17) | ECS 3 (1.8) | TEA (0.5) | NiS 4 (3.0) | (30) | DEG (25) | 7.42 | A |
| 20 | PPD 4 (15) | SN (15) | ECS 4 (1.5) | TEA (1.0) | NiS 2 (2.5) | (37) | GLY (28) | 7.14 | B |
| 21 (C) | PPD 3 (25) | SN (17) | ECS 1 (1.8) | TEA (0.5) | NiS 5 (2.5) | (25) | MEG (25) | 8.02 | A |
| 22 (C) | PPD 6 (20) | SN (30) | OA 1 (2.5) | KOH (0.8) | NiS 1 (2.0) | (23) | MEG (23) | 7.45 | A |
| 23 (C) | PPD 4 (30) | SN (18) | OA 2 (2.5) | DEA (1.0) | NiS 2 (2.0) | (26) | MEG (25) | 7.31 | A |

TABLE 3

Properties of the dispersions

| Dispersion from example | Stability | Pour point | Viscosity @ −10° C. | Yield point |
|---|---|---|---|---|
| 1 | >7 days | −30° C. | 44 mPas | <10 mPa |
| 2 | >7 days | −36° C. | 371 mPas | <10 mPa |
| 3 | >7 days | −36° C. | 467 mPas | <10 mPa |
| 4 | >7 days | −45° C. | 168 mPas | <10 mPa |
| 5 | >7 days | −45° C. | 110 mPas | <10 mPa |
| 6 | >7 days | <−50° C. | 157 mPas | <10 mPa |
| 7 | >7 days | <−50° C. | 127 mPas | <10 mPa |
| 8 | >7 days | <−50° C. | 624 mPas | 42 mPa |
| 9 | >7 days | <−50° C. | 145 mPas | <10 mPa |
| 10 | >7 days | <−50° C. | 259 mPas | <10 mPa |
| 11 | >7 days | −39° C. | 306 mPas | <10 mPa |
| 12 | >7 days | −36° C. | 940 mPas | 62 mPa |
| 13 | >7 days | −19° C. | 241 mPas | <10 mPa |
| 14 | >7 days | −39° C. | 209 mPas | <10 mPa |
| 15 | >7 days | −33° C. | 582 mPas | 35 mPa |
| 16 | >7 days | −36° C. | 205 mPas | <10 mPa |
| 17 | >7 days | <−50° C. | 614 mPas | 39 mPa |
| 18 | >7 days | −33° C. | 745 mPas | 50 mPa |
| 19 | >7 days | −36° C. | 102 mPas | <10 mPa |
| 20 | >7 days | −36° C. | 116 mPas | <10 mPa |
| 21 (C) | inhomogeneous | n.a. | n.a. | n.a. |
| 22 (C) | >7 days | −18° C. | 2017 mPas | 540 mPa |
| 23 (C) | >7 days | −24° C. | 1760 mPas | 306 mPa |

TABLE 5

Characterization of the crude oils

| Crude oil | Pour point | Aliphatics | Aromatics | Resins | Asphaltenes |
|---|---|---|---|---|---|
| A | 21° C. | 57.0% | 21.3% | 18.0% | 3.7% |
| B | 24° C. | 67.0% | 13.5% | 16.6% | 2.9% |

TABLE 4

Efficacy of the dispersions in crude oil A

| Example | Additive | Dosage rate | Pour point |
|---|---|---|---|
| 24 | Example 2 | 300 ppm | −12° C. |
| 25 | Example 5 | 300 ppm | −9° C. |
| 26 | Example 17 | 300 ppm | −15° C. |
| 27 (C) | PPD 1, 24% in xylene | 300 ppm | −6° C. |
| 28 (C) | PPD 2, 25% in Solvent Naphtha | 300 ppm | −15° C. |
| 29 (C) | PPD 3, 30% in Solvent Naphtha | 300 ppm | −12° C. |

TABLE 5

Efficacy of the dispersions in crude oil B

| Example | Additive | Dosage rate | Pour point |
|---|---|---|---|
| 30 | Example 2 | 200 ppm | 9° C. |
| 31 | Example 6 | 200 ppm | 6° C. |
| 32 | Example 10 | 200 ppm | 6° C. |
| 33 (C) | Example 23 (C) | 135 ppm | 12° C. |
| 34 (C) | PPD 3, 30% in Solvent Naphtha | 200 ppm | 9° C. |
| 35 (C) | PPD 4, 20% in Solvent Naphtha | 200 ppm | 12° C. |
| 36 (C) | PPD 5, 20% in Solvent Naphtha | 200 ppm | 9° C. |

The experiments show that the superior stability and improved cold properties and also the performance of the dispersions of the invention result to a crucial degree from the presence of ethercarboxylic salts. In addition, they show that the efficacy of the active ingredients formulated in the form of the dispersions of the invention is at least equal to and in various cases even superior to the solutions of the corresponding active ingredients in organic solvents.

The invention claimed is:

1. A dispersion consisting of an organic phase dispersed in an aqueous phase, in which
   a) the dispersed organic phase consists of at least one oil-soluble polymer effective as a cold flow improver for mineral oils as component I) and at least one organic, water-immiscible solvent as component II),
   b) the continuous aqueous phase consists of water as component IV) and at least one organic, water-miscible solvent as component V),
wherein the dispersion further contains
   c) 0.5% to 12% by weight of a dispersant as component III), which, based on the total amount of dispersant, consists of
      i) 5-95% by weight of a salt of an ethercarboxylic acid and
      ii) 95-5% by weight of a nonionic surfactant having an HLB value measured according to Griffin of greater than 7; and
      iii) optionally, an anionic, catonic and/or zwitterionic coemulsifier (VI).

2. The dispersion according to claim 1, in which the cold flow improver I is selected from the group consisting of
   i) copolymers of ethylene and ethylenically unsaturated esters, ethers and/or alkenes,
   ii) homo- or copolymers of $C_{10}$-$C_{30}$-alkyl-bearing esters, amides and/or imides of ethylenically unsaturated carboxylic acids,
   iii) ethylene copolymers grafted with ethylenically unsaturated esters and/or ethers,
   iv) homo- and copolymers of higher olefins, and
   v) condensation products of phenols bearing at least one alkyl radical and aldehydes and/or ketones.

3. The dispersion according to claim 1, in which the cold flow improver I) comprises a copolymer of ethylene and vinyl ester.

4. The dispersion according to claim 1, in which the cold flow improver I) is a homo- or copolymer of an ester, amide and/or imide of at least one ethylenically unsaturated dicarboxylic acid containing at least $C_{10}$-$C_{30}$-alkyl radical.

5. The dispersion according to claim 1, in which the cold flow improver is an ethylene copolymer grafted with an ethylenically unsaturated ester and/or ether, where the ethylene copolymer is an ethylene-vinyl ester copolymer.

6. The dispersion according to claim 5, wherein the ethylenically unsaturated ester is a $C_{10}$-$C_{30}$-alkyl-bearing ester of acrylic acid and/or methacrylic acid.

7. The dispersion according to claim 1, in which the cold flow improver is a homo- and copolymer of a-olefins having 3 to 30 carbon atoms.

8. The dispersion according to claim 1, in which the cold flow improver is a condensation product of at least one phenol bearing at least one alkyl radical and at least one aldehyde or ketone.

9. The dispersion according to claim 8, in which the condensation product conforms to the formula (6)

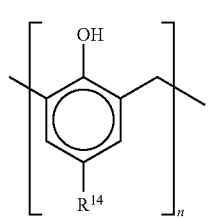

(6)

in which
$R^{14}$ is $C_1$- to $C_{100}$-alkyl, $C_2$- to —$C_{100}$-alkenyl, O—$C_1$- to O—$C_{100}$-alkyl, O—$C_2$- to O—$C_{100}$-alkenyl, C(O)—O—$C_1$- to C(O)—O—$C_{100}$-alkyl, C(O)—O—$C_2$- to C(O)—O—$C_{100}$-alkenyl, O—C(O)—$C_1$- to O—C(O)—$C_{100}$-alkyl or O—C(O)—$C_2$- to O—C(O)—$C_{100}$-alkenyl, and
n is a number from 2 to 250.

10. The dispersion according to claim 1, in which the salt of an ethercarboxylic acid has been prepared by neutralization of at least one ethercarboxylic acid with at least one base of the alkali metals or alkaline earth metals or an amine.

11. The dispersion according to claim 1, in which the ethercarboxylic acid conforms to the formula (7)

in which
$R^{15}$ is a linear or branched alkyl or alkenyl group having 4 to 24 carbon atoms, an alkylaryl group wherein the alkyl radical has 1 to 24 carbon atoms, or an aryl group,
x is the number 2 and/or 3 and
y is a number from 0 to 20.

12. The dispersion according to claim 10, in which the amine is an alkanolamine.

13. The dispersion according to claim 12, in which the alkanolamine is a primary, secondary or tertiary amine bearing at least one alkyl radical substituted by a hydroxyl group.

14. The dispersion according to claim 12, in which the alkanolamine conforms to the formula (9):

$R^{16}$ is a hydrocarbyl radical which bears at least one hydroxyl group and has 1 to 10 carbon atoms and
$R^{17}$, $R^{18}$ are independently hydrogen, an optionally substituted hydrocarbyl radical having 1 to 50 carbon atoms.

15. The dispersion according to claim 10, in which the amine is a heterocyclic compound comprising a cycle which has 5 to 7 ring members and comprises not only a nitrogen atom but also an oxygen atom, and which bears, on the nitrogen atom, an alkyl radical having 1 to 4 carbon atoms or a group of the formula (10)

in which
B is an alkylene radical having 2 or 3 carbon atoms, and
p is 1 or 2, and
$R^{19}$ is hydrogen or a group of the formula —B—$NH_2$.

16. The dispersion according to claim 1, in which the nonionic surfactant is selected from the group consisting of
   a) 1- to 80-tuply ethoxylated $C_8$- to $C_{20}$-alkanol, $C_8$- to $C_{12}$-alkylphenol, $C_8$- to $C_{20}$ fatty acid, $C_8$- to $C_{20}$ fatty acid amide,
   b) copolymers of ethylene oxide and propylene oxide, and
   c) partial esters of polyols with fatty acids.

17. The dispersion according to claim 1, in which the nonionic surfactant conforms to the structural formulae (11) to (14)

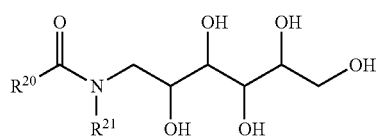

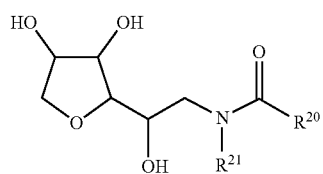

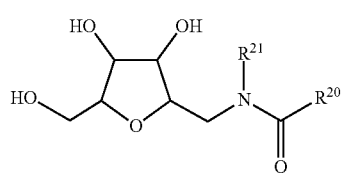

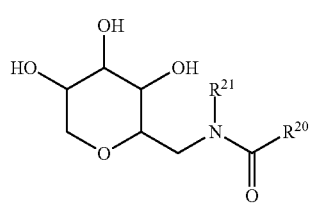

in which
$R^{20}$ is an aliphatic hydrocarbyl radical having 5 to 29 carbon atoms and
$R^{21}$ is an aliphatic hydrocarbyl radical having 1 to 6 carbon atoms.

18. The dispersion according to claim 1, in which the weight ratio between ethercarboxylic salt and nonionic surfactant is between 1:10 and 10:1.

19. The dispersion according to claim 1, in which the dispersant (III) includes the anionic, cationic and/or zwitterionic coemulsifier (VI).

20. The dispersion according to claim 1, in which the water-miscible solvent (V) has a relative permittivity $\varepsilon_r$ of at least 3.

21. The dispersion according to claim 1, wherein the organic, water-miscible solvent (V) is selected from alcohols, glycols, poly(glycols), acetates, ketones and lactones.

22. The dispersion according to claim 1, wherein the dispersed organic phase comprises 5%-60% by weight of the oil-soluble polymer effective as a cold flow improver for mineral oils as component I).

23. The dispersion according to claim 1, wherein the dispersed organic phase comprises 5-40% by weight of the water-immiscible solvent (II).

24. The dispersion according to claim 1, wherein the continuous aqueous phase comprises 20-80% by weight of water as component (IV) and at least one organic, water-miscible solvent as component (V).

25. The dispersion according to claim 1, in which the continuous phase contains between 10% and 90% by weight of water (IV) and between 90% and 10% by weight of the organic, water-miscible solvent (V), based on the total amount of the continuous phase.

26. The dispersion according to claim 1, in which the pH of the dispersion is above 6.0, measured as a 1% dilution in water.

27. The dispersion according to claim 1, in which a rheology-modifying substance that generates a yield point is added, which is a water-soluble polymer.

28. A process for producing a dispersion consisting of an organic phase dispersed in a aqueous phase, in which
   a) the dispersed organic phase consists of at least one oil-soluble polymer effective as a cold flow improver for mineral oils as component I) and at least one organic. water-immiscible solvent as component II),
   b) the continuous aqueous phase consists of water as component IV) and at least one organic. water-miscible solvent as component V), wherein the dispersion contains
   c) 0.5% to 12% by weight of a dispersant as component III), which. based on the total amount of dispersant, consists of
      i) 5-95% by weight of a salt of an ethercarboxylic acid and
      ii) 95-5% by weight of a nonionic surfactant having an HLB value measured according to Griffin of greater than 7; and
      iii) optionally, an anionic, cationic and/or zwitterionic coemulsifier (VI), the process comprising converting constituents I, II, III, IV, V, and VI to a dispersion by mixing with stirring at temperatures above 50° C.

29. A process for producing a dispersion according to claim 28, by using a solution of the oil-soluble polymer (I) effective as a cold flow improver for mineral oils in the organic, water-immiscible solvent (II).

30. A process for producing a dispersion according to claim 28, by adding a mixture of constituents I and II to a mixture of water (IV), the organic, water-miscible solvent (V) and the dispersant (Ill) at temperatures between 30° C. and 100° C., so as to form an oil-in-water dispersion.

31. A process for producing a dispersion according to claim 28, by homogenizing constituents I), II) and III) and then adding a mixture of constituents IV and V at temperatures between 30° C. and 100° C., so as to form an oil-in-water dispersion.

32. A process for producing a dispersion according to claim 28, by subjecting the mixture of the constituents to shear.

33. A process for improving the cold flow properties of crude oil, heating oil, bunker oil, residue oil and mineral oil that contains at least one residue oil, comprising adding thereto a dispersion consisting of an organic phase dispersed in an aqueous phase, in which a) the dispersed organic phase consists of at least one oil-soluble polymer effective as a cold flow improver for mineral oils as component I) and at least one organic, water-immiscible solvent as component II),
b) the continuous aqueous phase consists of water as component IV) and at least one organic, water-miscible solvent as component V), wherein the dispersion contains c) 0.5% to 12% by weight of a dispersant as component III), which, based on the total amount of dispersant, consists of
  i) 5-95% by weight of a salt of an ethercarboxylic acid and
  ii) 95-5% by weight of a nonionic surfactant having an HLB value measured according to Griffin of greater than 7, to a paraffinic mineral oil and products produced therefrom; and
  iii) optionally, an anionic, cationic and/or zwitterionic coemulsifier (VI).

* * * * *